United States Patent
Sinn et al.

(10) Patent No.: US 7,467,142 B2
(45) Date of Patent: Dec. 16, 2008

(54) RULE BASED DATA MANAGEMENT

(75) Inventors: Richard P. Sinn, Milpitas, CA (US); Thomas B. Remahl, Los Altos, CA (US); Andy M. Tsang, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 642 days.

(21) Appl. No.: 10/327,607

(22) Filed: Dec. 20, 2002

(65) Prior Publication Data

US 2004/0010519 A1 Jan. 15, 2004

Related U.S. Application Data

(60) Provisional application No. 60/395,152, filed on Jul. 11, 2002.

(51) Int. Cl.
*G06F 12/00* (2006.01)
*G06F 17/30* (2006.01)

(52) U.S. Cl. ............... 707/10; 707/200; 707/3; 707/201; 707/202; 709/202; 709/224; 709/225; 709/227

(58) Field of Classification Search ............ 707/3, 707/1, 9, 10, 201, 202, 205; 705/14, 36; 726/13; 709/202, 224, 225, 227
See application file for complete search history.

(56) References Cited

U.S. PATENT DOCUMENTS

| | | | |
|---|---|---|---|
| 5,010,478 A | 4/1991 | Deran | |
| 5,077,666 A | 12/1991 | Brimm et al. | |
| 5,455,953 A | 10/1995 | Russell | |
| 5,530,861 A | 6/1996 | Diamant et al. | |
| 5,581,691 A | 12/1996 | Hsu et al. | |
| 5,664,154 A | 9/1997 | Purcell et al. | |
| 5,678,041 A | 10/1997 | Baker et al. | |
| 5,692,125 A | 11/1997 | Schloss et al. | |
| 5,708,780 A | 1/1998 | Levergood et al. | |
| 5,713,023 A | 1/1998 | Hayata et al. | |
| 5,721,900 A | 2/1998 | Banning et al. | |
| 5,724,595 A | 3/1998 | Gentner | |
| 5,732,408 A | 3/1998 | Takahashi | |
| 5,734,837 A | 3/1998 | Flores et al. | |

(Continued)

OTHER PUBLICATIONS

U.S. Appl. No. 10/314,888, Office Action dated Jan. 26, 2006, 31 pages.

(Continued)

*Primary Examiner*—Jean M. Corrielus
*Assistant Examiner*—Giovanna Colan
(74) *Attorney, Agent, or Firm*—Townsend and Townsend and Crew LLP

(57) ABSTRACT

Data is acquired for an Identity System based on a one or more rules. The data can be from the same Identity System Component, another Identity System Component or a component external to the Identity System. The acquired data can be used to populate an Identity Profile, configure a workflow, or provide information to any other object, process, component, etc. of the Identity System. In one embodiment, the present invention combines dynamic identity value substitution and directory filter rules to enable rule based identity management. It enables dynamic population of identity data and real-time routing for identity management workflows. In other embodiments, the present invention can be applied to systems other than Identity Systems.

33 Claims, 15 Drawing Sheets

U.S. PATENT DOCUMENTS

| | | | |
|---|---|---|---|
| 5,754,939 A * | 5/1998 | Herz et al. | 455/3.04 |
| 5,764,890 A | 6/1998 | Glasser et al. | |
| 5,815,703 A | 9/1998 | Copeland et al. | |
| 5,848,273 A | 12/1998 | Fontana et al. | |
| 5,944,824 A | 8/1999 | He | |
| 5,991,810 A | 11/1999 | Shapiro et al. | |
| 5,999,911 A | 12/1999 | Berg et al. | |
| 6,014,666 A | 1/2000 | Helland et al. | |
| 6,044,465 A * | 3/2000 | Dutcher et al. | 726/13 |
| 6,073,109 A | 6/2000 | Flores et al. | |
| 6,078,747 A | 6/2000 | Jewitt | |
| 6,098,056 A | 8/2000 | Rusnak et al. | |
| 6,131,120 A | 10/2000 | Reid | |
| 6,134,634 A | 10/2000 | Marshall, Jr. et al. | |
| 6,138,104 A | 10/2000 | Marchak et al. | |
| 6,141,778 A | 10/2000 | Kane et al. | |
| 6,145,003 A | 11/2000 | Sanu et al. | |
| 6,151,531 A | 11/2000 | Frankel et al. | |
| 6,158,010 A | 12/2000 | Moriconi et al. | |
| 6,182,142 B1 | 1/2001 | Win et al. | |
| 6,195,710 B1 | 2/2001 | Borgendale et al. | |
| 6,208,986 B1 | 3/2001 | Schneck et al. | |
| 6,212,558 B1 | 4/2001 | Antur et al. | |
| 6,253,202 B1 * | 6/2001 | Gilmour | 707/9 |
| 6,253,239 B1 | 6/2001 | Shklar et al. | |
| 6,253,257 B1 | 6/2001 | Dundon | |
| 6,256,737 B1 * | 7/2001 | Bianco et al. | 713/186 |
| 6,256,739 B1 | 7/2001 | Skopp et al. | |
| 6,260,077 B1 | 7/2001 | Rangarajan et al. | |
| 6,266,420 B1 | 7/2001 | Langford et al. | |
| 6,278,993 B1 | 8/2001 | Kumar et al. | |
| 6,279,043 B1 | 8/2001 | Hayward et al. | |
| 6,314,470 B1 | 11/2001 | Ward et al. | |
| 6,323,881 B1 | 11/2001 | Broulik et al. | |
| 6,335,927 B1 * | 1/2002 | Elliott et al. | 370/352 |
| 6,338,097 B1 | 1/2002 | Krenzke et al. | |
| 6,343,287 B1 | 1/2002 | Kumar et al. | |
| 6,347,312 B1 | 2/2002 | Byrne et al. | |
| 6,349,306 B1 | 2/2002 | Malik et al. | |
| 6,353,929 B1 | 3/2002 | Houston | |
| 6,366,913 B1 | 4/2002 | Fitler, Jr. et al. | |
| 6,401,101 B1 | 6/2002 | Britton et al. | |
| 6,401,138 B1 | 6/2002 | Judge et al. | |
| 6,415,368 B1 | 7/2002 | Glance et al. | |
| 6,434,531 B1 | 8/2002 | Lancelot et al. | |
| 6,442,567 B1 | 8/2002 | Retallick et al. | |
| 6,490,655 B1 | 12/2002 | Kershaw | |
| 6,499,023 B1 | 12/2002 | Dong et al. | |
| 6,523,022 B1 * | 2/2003 | Hobbs | 707/3 |
| 6,529,941 B2 | 3/2003 | Haley et al. | |
| 6,539,379 B1 | 3/2003 | Vora et al. | |
| 6,549,941 B1 | 4/2003 | Jaquith et al. | |
| 6,611,840 B1 | 8/2003 | Baer et al. | |
| 6,647,383 B1 * | 11/2003 | August et al. | 707/3 |
| 6,671,695 B2 | 12/2003 | McFadden | |
| 6,671,745 B1 | 12/2003 | Mathur et al. | |
| 6,701,368 B1 | 3/2004 | Chennapragada et al. | |
| 6,704,807 B1 | 3/2004 | Mathur et al. | |
| 6,704,873 B1 | 3/2004 | Underwood | |
| 6,708,170 B1 | 3/2004 | Byrne et al. | |
| 6,721,804 B1 | 4/2004 | Rubin et al. | |
| 6,732,178 B1 | 5/2004 | Van Horne et al. | |
| 6,732,179 B1 | 5/2004 | Brown et al. | |
| 6,741,853 B1 | 5/2004 | Jiang et al. | |
| 6,757,720 B1 | 6/2004 | Wechler, Jr. | |
| 6,760,750 B1 | 7/2004 | Boneh et al. | |
| 6,768,988 B2 | 7/2004 | Boreham et al. | |
| 6,769,000 B1 * | 7/2004 | Akhtar et al. | 707/103 R |
| 6,785,686 B2 | 8/2004 | Boreham et al. | |
| 6,785,713 B1 | 8/2004 | Freeman et al. | |
| 6,785,726 B1 | 8/2004 | Freeman et al. | |
| 6,839,701 B1 | 1/2005 | Baer et al. | |
| 6,880,086 B2 | 4/2005 | Kidder et al. | |
| 6,948,135 B1 | 9/2005 | Ruthfield et al. | |
| 7,013,435 B2 | 3/2006 | Gallo et al. | |
| 7,013,469 B2 | 3/2006 | Smith et al. | |
| 7,035,926 B1 | 4/2006 | Cohen et al. | |
| 7,039,871 B2 | 5/2006 | Cronk | |
| 7,069,330 B1 | 6/2006 | McArdle et al. | |
| 7,076,784 B1 | 7/2006 | Russell et al. | |
| 7,114,037 B2 | 9/2006 | Agarwal et al. | |
| 7,120,914 B1 | 10/2006 | Manthos et al. | |
| 7,213,249 B2 * | 5/2007 | Loo et al. | 719/330 |
| 7,216,163 B2 * | 5/2007 | Sinn | 709/224 |
| 7,231,661 B1 * | 6/2007 | Villavicencio et al. | 726/4 |
| 7,249,369 B2 * | 7/2007 | Knouse et al. | 726/1 |
| 7,266,595 B1 | 9/2007 | Black et al. | |
| 7,340,447 B2 * | 3/2008 | Ghatare | 707/3 |
| 7,349,912 B2 * | 3/2008 | Delany et al. | 707/101 |
| 7,363,339 B2 * | 4/2008 | Delany et al. | 709/202 |
| 7,380,008 B2 * | 5/2008 | Teng et al. | 709/227 |
| 7,398,311 B2 * | 7/2008 | Joshi et al. | 709/225 |
| 2002/0032684 A1 | 3/2002 | Kobayashi et al. | |
| 2002/0038306 A1 | 3/2002 | Griffin et al. | |
| 2002/0049749 A1 * | 4/2002 | Helgeson et al. | 707/3 |
| 2002/0067370 A1 | 6/2002 | Forney et al. | |
| 2002/0073180 A1 | 6/2002 | Dewhurst et al. | |
| 2002/0083178 A1 | 6/2002 | Brothers | |
| 2002/0138763 A1 | 9/2002 | Delany et al. | |
| 2002/0161766 A1 * | 10/2002 | Lawson et al. | 707/9 |
| 2003/0028752 A1 | 2/2003 | Fu et al. | |
| 2003/0037052 A1 | 2/2003 | Kitain et al. | |
| 2003/0055762 A1 * | 3/2003 | Holt | 705/36 |
| 2003/0055806 A1 | 3/2003 | Wong et al. | |
| 2003/0065558 A1 * | 4/2003 | Shaw et al. | 705/14 |
| 2003/0083908 A1 | 5/2003 | Steinmann | |
| 2003/0088708 A1 | 5/2003 | Lewallen | |
| 2003/0097380 A1 | 5/2003 | Mulhern et al. | |
| 2003/0105733 A1 * | 6/2003 | Boreham et al. | 707/1 |
| 2003/0105742 A1 | 6/2003 | Boreham et al. | |
| 2003/0115196 A1 | 6/2003 | Boreham et al. | |
| 2003/0115548 A1 | 6/2003 | Melgar | |
| 2003/0120593 A1 | 6/2003 | Bansal et al. | |
| 2003/0120601 A1 | 6/2003 | Ouye et al. | |
| 2003/0144982 A1 * | 7/2003 | Reulein et al. | 707/1 |
| 2003/0145074 A1 | 7/2003 | Penick | |
| 2003/0204481 A1 | 10/2003 | Lau | |
| 2003/0208397 A1 * | 11/2003 | VanDusen | 705/14 |
| 2003/0217127 A1 | 11/2003 | Sinn | |
| 2003/0217333 A1 | 11/2003 | Smith et al. | |
| 2004/0003351 A1 | 1/2004 | Sommerer et al. | |
| 2004/0024762 A1 | 2/2004 | Agarwal et al. | |
| 2005/0240490 A1 | 10/2005 | Mackey | |

OTHER PUBLICATIONS

U.S. Appl. No. 10/345,873, Office Action dated Sep. 9, 2005, 13 pages.
U.S. Appl. No. 10/345,873, Office Action dated Mar. 10, 2006, 7 pages.
U.S. Appl. No. 10/354,913, Office Action dated Sep. 9, 2003, 19 pages.
U.S. Appl. No. 10/354,913, Final Office Action dated Apr. 6, 2004, 22 pages.
U.S. Appl. No. 10/354,913, Office Action dated Apr. 15, 2005, 20 pages.
U.S. Appl. No. 10/354,913, Final Office Action dated Dec. 5, 2005, 15 pages.
U.S. Appl. No. 10/354,914, Office Action dated Aug. 1, 2005, 15 pages.
U.S. Appl. No. 10/354,914, Final Office Action dated Feb. 10, 2006, 16 pages.
U.S. Appl. No. 10/354,914, Notice of Allowance dated Mar. 12, 2008, 11 pages.

Leon, McAfee's NetTools Promises to Ease Network Desktop Diagnosis, InfoWorld, San Mateo, Jul. 24, 1995, vol. 17, Iss. 30, p. 53.

Cooney, IBM rolls out host and server-based mgmt. apps, Network World, Framingham, Feb. 6, 1995, vol. 12, Iss. 6, pp. 6-7.

Walsh, Remedy releases three applications for help-desk suite, InfoWorld, San Mateo, Apr. 21, 1997, vol. 19, Iss. 16, p. 34.

Schmersal, Testing to maintain service standards, Communications News, Nokomis, Mar. 1998, vol. 35, Iss. 3, pp. 22-23.

Musthaler, The trouble with help desk selection, Network World, Framingham, Feb. 20, 1995, vol. 12, Iss. 8, pp. 35-39.

Clear Trust, Unified Access Management Securant Technologies, Inc., pp. 1-23, 1997.

SiteMinder Agent Operations, Version 4.0, Netegrity Inc., 1997.

SiteMinder Deployment Guide, Version 4.0, Netegrity Inc., 1997.

SiteMinder Policy Server Operations Guide, Version 4.0, Netegrity Inc., 1997.

SiteMinder Developer's API Guide, Version 4.0, Netegrity Inc., 1997.

SiteMinder Installation Guide, Version 4.0, Netegrity Inc., 1997.

Kim, K.H., "APIs for Real-Time Diistributed Object Programming", Coputer, IEEE 2000, June, pp. 72-80.

McLellan, et al., "Building More Usable APIs", IEEE Software, pp. 78-86, May/Jun. 1998.

Saba—Products, Saba Enterprise 5, dated 1997-2006, 2 pages.

Saba—Company, dated 1997-2006, 1 page.

Saba—Solutions, Competency-Driven HCM, dated 1997-2006, 1 page.

Saba—Talent, dated 1997-2006, 2 pages.

Saba—Collaboration, dated 1997-2006, 1 page.

Stets, et al., "Component-Based APIs for Versioning and Distributed Applications", IEEE, pp. 54-61, 1999.

U.S. Appl. No. 09/570,276, Office Action dated Nov. 14, 2006, 28 pages.

U.S. Appl. No. 10/314,888, Office Action dated Jul. 26, 2006, 26 pages.

U.S. Appl. No. 10/325,465, Office Action dated Sep. 19, 2006, 25 pages.

U.S. Appl. No. 10/328,920, Office Action dated May 31, 2006, 20 pages.

U.S. Appl. No. 10/345,879, Office Action dated Oct. 5, 2006, 30 pages.

U.S. Appl. No. 10/354,913, Office Action dated May 12, 2005, 16 pages.

U.S. Appl. No. 09/570,276, Office Action dated Mar. 25, 2003, 36 pages.

U.S. Appl. No. 09/570,276, Final Office Action dated Sep. 5, 2003, 24 pages.

U.S. Appl. No. 09/570,276, Advisory Action dated Nov. 17, 2003, 3 pages.

U.S. Appl. No. 09/570,276, Office Action dated Jan. 14, 2004, 17 pages.

U.S. Appl. No. 09/570,276, Office Action dated Sep. 13, 2004, 16 pages.

U.S. Appl. No. 09/570,276, Final Office Action dated Feb. 21, 2006, 17 pages.

U.S. Appl. No. 09/570,276, Final Office Action dated Jul. 9, 2007, 16 pages.

U.S. Appl. No. 09/570,276, Office Action dated Oct. 2, 2007, 14 pages.

U.S. Appl. No. 10/314,888, Final Office Action dated Feb. 9, 2007, 34 pages.

U.S. Appl. No. 10/314,888, Office Action dated Jul. 27, 2007, 37 pages.

U.S. Appl. No. 10/325,465, Final Office Action dated Apr. 4, 2007, 25 pages.

U.S. Appl. No. 10/325,465, Advisory Action dated Jun. 19, 2007, 3 pages.

U.S. Appl. No. 10/325,465, Office Action dated Dec. 12, 2007, 20 pages.

U.S. Appl. No. 10/328,920, Notice of Allowance dated Dec. 5, 2006, 8 pages.

U.S. Appl. No. 10/345,873, Notice of Allowance dated Jul. 6, 2006, 6 pages.

U.S. Appl. No. 10/345,879, Final Office Action dated May 17, 2007, 39 pages.

U.S. Appl. No. 10/345,879, Advisory Action dated Jul. 27, 2007, 5 pages.

U.S. Appl. No. 10/345,879, Office Action dated Oct. 31, 2007, 35 pages.

U.S. Appl. No. 10/354,913, Final Office Action dated Oct. 31, 2006, 15 pages.

U.S. Appl. No. 10/354,913, Final Office Action dated Apr. 18, 2007, 20 pages.

U.S. Appl. No. 10/354,913, Ex Parte Quayle Action dated Nov. 1, 2007, 7 pages.

U.S. Appl. No. 10/354,914, Office Action dated Sep. 22, 2006, 8 pages.

U.S. Appl. No. 10/354,914, Final Office Action dated Apr. 5, 2007, 9 pages.

U.S. Appl. No. 11/684,796, Office Action dated Nov. 27, 2007, 25 pages.

U.S. Appl. No. 10/952,592, Office Action dated Oct. 4, 2006, 17 pages.

U.S. Appl. No. 10/952,592, Final Office Action dated May 3, 2007, 54 pages.

U.S. Appl. No. 10/952,592, Office Action dated Aug. 23, 2007, 22 pages.

U.S. Appl. No. 10/354,913, Office Action dated Feb. 7, 2008, 10 pages.

U.S. Appl. No. 10/314,888, Final Office Action dated Feb. 22, 2008, 37 pages.

U.S. Appl. No. 11/684,796, Final Office Action dated Jun. 17, 2008, 22 pages.

* cited by examiner

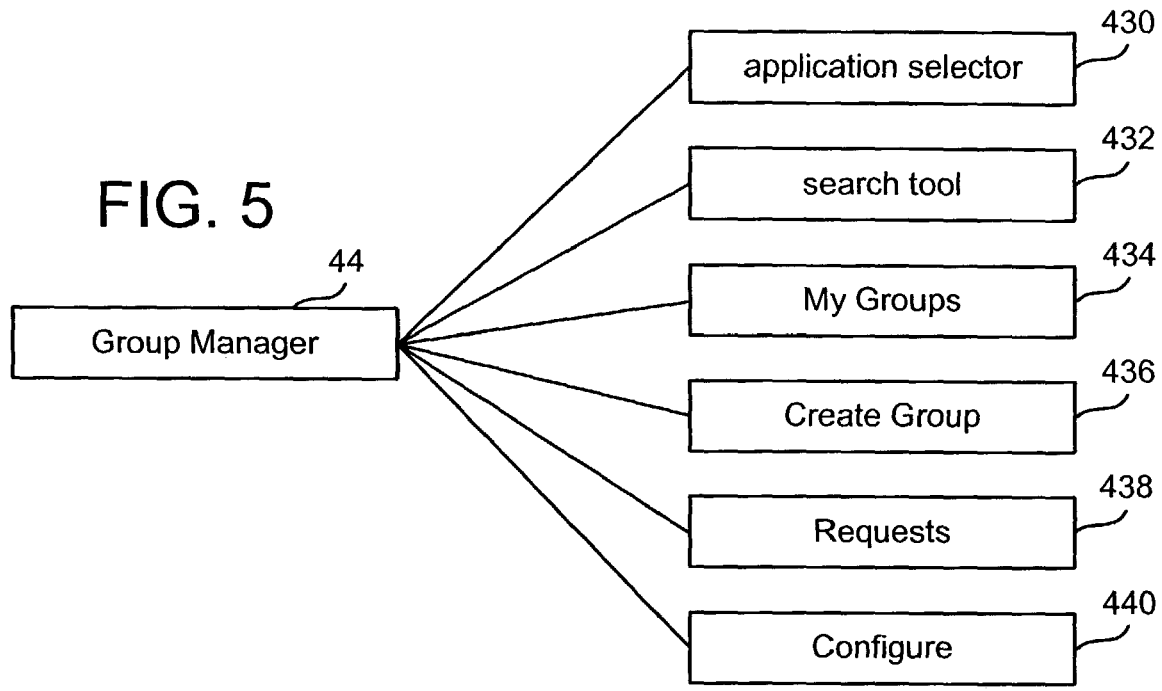
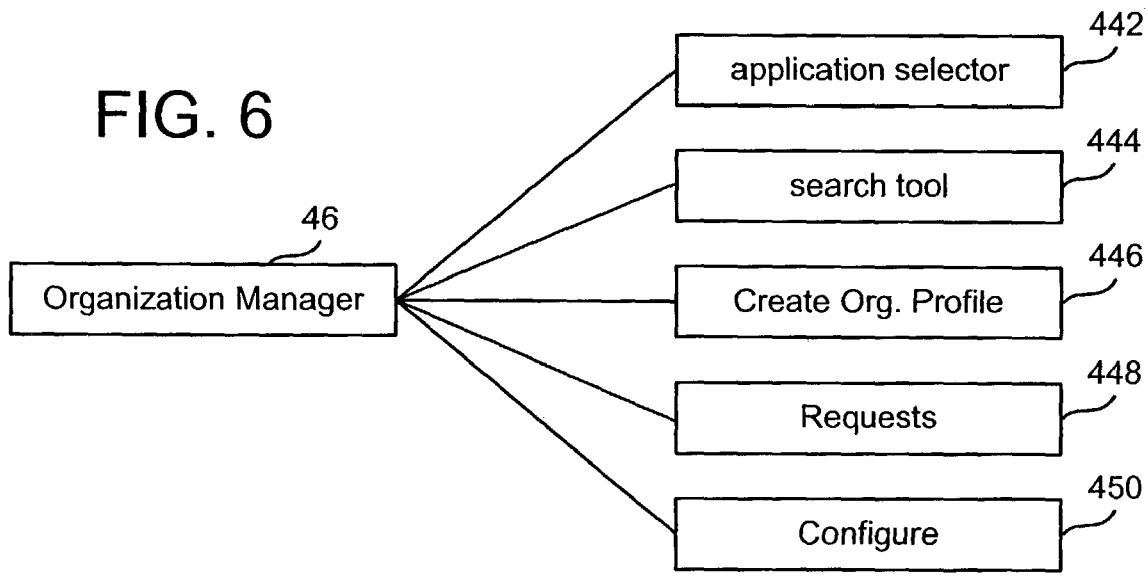

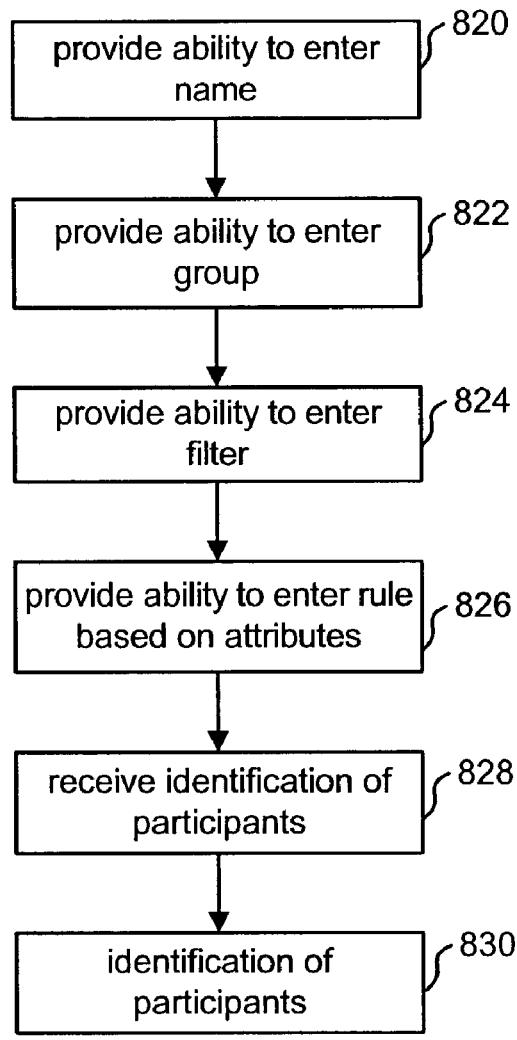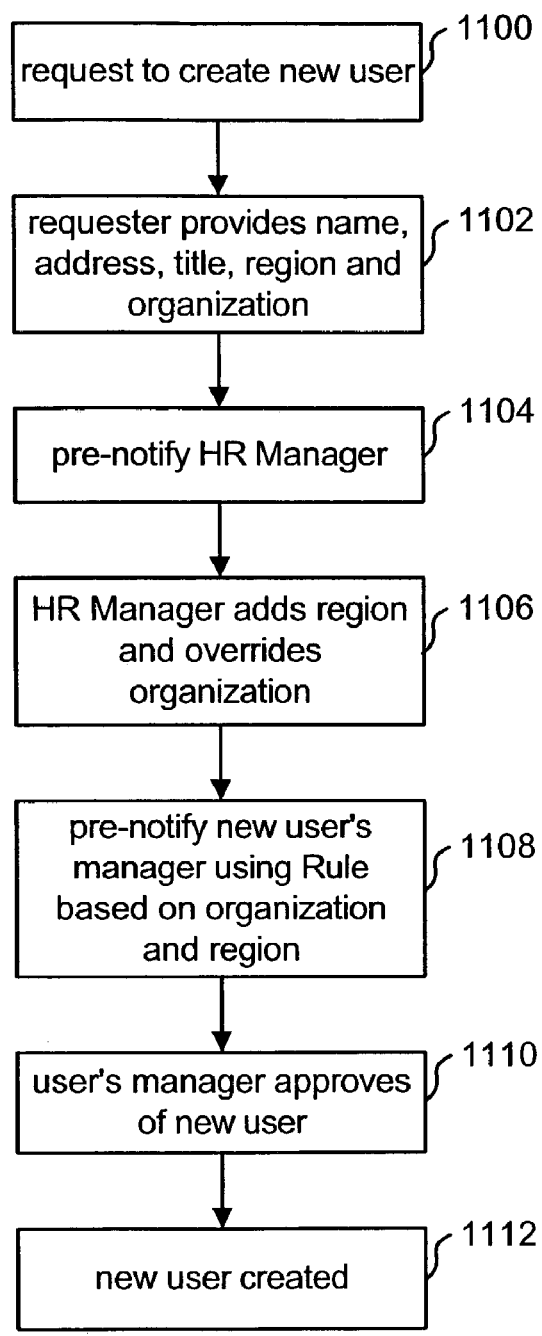

RULE BASED DATA MANAGEMENT

This application claims the benefit of U.S. Provisional Application No. 60/395,152, "Access and Identity System," filed on Jul. 11, 2002, which is incorporated herein by reference.

BACKGROUND OF THE INVENTION

1. Field of the Invention

The present invention is directed to technology for managing data using rules.

2. Description of the Related Art

With the growth of the Internet, the use of networks and other information technologies, Identity Systems have become more popular. In general, an Identity System provides for the creation, removal, editing and other managing of identity information stored in various types of data stores. The identity information pertains to users, groups, organizations and/or things. For each entry in the data store, a set of attributes are stored. For example, the attributes stored for a user may include a name, address, employee number, organization, region, telephone number, email address, user ID and password. The Identity System can also manage access privileges that govern what an entity can view, create, modify or use in the Identity System. Often, this management of access privileges is based on one or more specific attributes, membership in a group and/or association with an organization.

Entities managed by an Identity System may require access to or be associated with a variety of data and resources that may be internal or external to the Identity System. For example, a user may need job codes identifying tasks performed by resources, information about various resources, information from other entities managed by the Identity System, approval from other entities to perform tasks, cooperation from other entities to perform tasks, etc. These dependencies create management and maintenance problems for administrators of the Identity System. For example, when creating an entry for a new user, the person creating the entry needs to know which resources are available to that user and which other entities are associated with that new user (e.g. assistants, managers, partners, etc.). Additionally, as the information about resources and associated entities change, the entry for the new user must be updated.

Therefore, there is a need to provide an improved system for managing data in an Identity System that reduces the management and maintenance effort.

SUMMARY OF THE INVENTION

The present invention, roughly described, pertains to technology for managing data using rules. For example, data is acquired based on one or more rules. The rules utilize information from an identity profile in the Identity System. The acquired data can be from the same Identity System Component, another Identity System Component or a component external to the Identity System. The acquired data can be used to populate an Identity Profile, configure a workflow, or provide information to any other object, process, component, etc. of an Identity System. In one embodiment, the present invention combines dynamic identity value substitution and directory filter rules to enable rule based identity management. It enables dynamic population of identity data and real-time routing for identity management workflow. In other embodiments the present invention can be applied to systems other than Identity Systems.

One implementation of the present invention includes accessing first data from a data unit, applying the first data to a rule, identifying additional data based on the rule and adding the additional data to the data unit. The additional data can be used to add values for attributes of an identity profile. Alternatively, the additional data can be used to add job codes or an identification of a resource to an identity profile. Based on the job code or the identification of the resource, a task can be provisioned for the particular resource.

Another implementation of the present invention includes accessing first data from a data unit, where the data unit is accessed as part of a workflow. The first data is applied to a rule. Additional data is identified based on the rule. The additional data is then used to perform the workflow.

The above described processes can be fully or partially performed by an Identity System. Alternatively, the above described processes can be performed by a system other than an Identity System.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, peripherals and/or communication interfaces.

These and other objects and advantages of the present invention will appear more clearly from the following description in which the preferred embodiment of the invention has been set forth in conjunction with the drawings.

BRIEF DESCRIPTION OF THE DRAWINGS

FIG. 5 is a block diagram describing the services of the Group Manager.

FIG. 6 is a block diagram describing the services of the Organization Manager.

FIG. 14 is a flow chart describing one embodiment of a process for identifying which participants may perform an action.

FIG. 18 is a flow chart describing one embodiment of a process for creating a new user.

DETAILED DESCRIPTION

The present invention, roughly described, pertains to technology for managing data using rules. The present invention can also be used with many different systems. For example, the present invention can be used with an Identity System or an Access Management System. The present invention can also be used with other systems.

Figure 1:
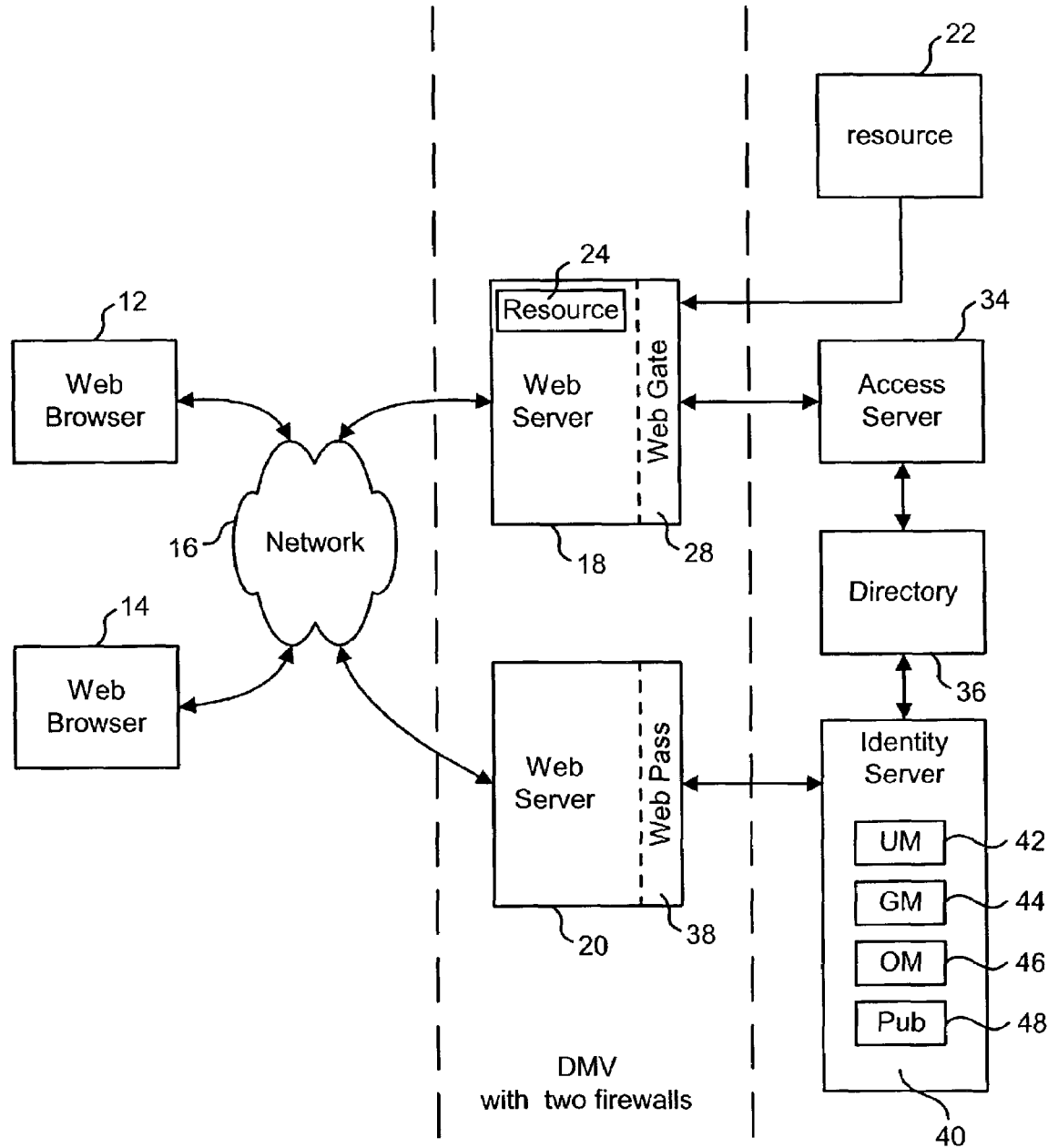
FIG. 1 is a block diagram depicting the components of one embodiment of a system that can implement the present invention.

FIG. 1 depicts an example of an access management system that provides identity management services and/or access management services for a network. The identity management portion of the system (hereinafter "the Identity System") manages identity profiles, while the access management portion of the system (hereinafter "the Access System") provides security for resources across one or more Web Servers (or other components). A feature of one embodiment of this system is the centralization of the repositories for policies and identity profiles, while decentralizing their administration. That is, the system centralizes the policy and identity repositories by building them on a directory service technology. The system decentralizes their administration by hierarchy delegating administrative roles. Although the system of FIG. 1 includes an integrated Identity System and Access System, other embodiments may only include an Identity System or only include an Access System.

FIG. 1 is a block diagram depicting one embodiment for deploying an integrated Identity System and Access System. FIG. 1 shows web browsers 12 and 14 accessing Web Server 18 and/or Web Server 20 via network 16. One example of a network is the Internet. In one embodiment, web browsers 12 and 14 are standard web browsers known in the art running on any suitable type of computer. FIG. 1 depicts web browsers 12 and 14 communicating with Web Server 18 and Web Server 20 using HTTP over the Internet; however, other protocols and networks can also be used.

Web Server 18 is a standard Web Server known in the art and provides an end user with access to various resources via network 16. One embodiment includes two firewalls. A first firewall (see dotted lines) is connected between network 16 and Web Server 18. A second firewall (see dotted lines) is connected between Web Servers 16 and 18 and Access Server 34/Identity Server 40.

FIG. 1 shows two types of resources: resource 22 and resource 24. Resource 22 is external to Web Server 18 but can be accessed through Web Server 18. Resource 24 is located on Web Server 18. A resource can be anything that is possible to address with a uniform resource locator (URL, see RFC 1738). A resource can include a web page, software application, file, database, directory, data unit, etc. In one embodiment, a resource is anything accessible to a user via a network. The network could be the Internet, a LAN, a WAN, or any other type of network.

FIG. 1 shows Web Server 18 including Web Gate 28, which is a software module. In one embodiment, Web Gate 28 is a plug-in to Web Server 18. Web Gate 28 communicates with Access Server 34. Access Server 34 communicates with Directory 36.

The Access System includes Access Server 34, Web Gate 28, and Directory 36. Access Server 34 provides authentication, authorization, auditing and logging services. It further provides for identity profiles to be used across multiple domains and for access based on a single web-based authentication (sign-on). Web Gate 28 acts as an interface between Web Server 18 and Access Server 34. Web Gate 28 intercepts requests from users for resources 22 and 24, and authorizes them via Access Server 34. Access Server 34 is able to provide centralized authentication, authorization, and auditing services for resources hosted on or available to Web Server 18 and other Web Servers.

The Identity System includes Web Pass 38, Identity Server 40 and Directory 36. Identity Server 40 manages identity profiles. An identity profile is a set of information associated with a particular entity (e.g. user, group, organization, etc.). The data elements of the identity profile are called attributes. An attribute may include a name, a value and access criteria. The Identity Server includes three main applications, which effectively handle the identity profiles and privileges of the user population: User Manager 42, Group Manager 44, and Organization Manager (also called Object Manager) 46. User Manager 42 manages the identity profiles for individual users. Group Manager 44 manages identity profiles for groups. Organization Manager 46 manages identity profiles for organizations and/or can manage any object. Identity Server 40 also includes Publisher 48, an application that enables entities to quickly locate and graphically view information stored by Directory 36. In one embodiment, Web Pass 38 is a Web Server plug-in that sends information back and forth between Identity Server 40 and the Web Server 20, creating a three-tier architecture. The Identity System also provides a Certificate Processing Server (not shown in FIG. 1) for managing digital certificates.

User Manager 42 handles the functions related to user identities and access privileges, including creation and deletion of user identity profiles, modification of user identity profile data, determination of access privileges, and credentials management of both passwords and digital certificates. With User Manager 42, the create, delete, and modify functions of user identity management can be set as flexible, multi-step workflows. Each business can customize its own approval, setup, and management processes and have multiple processes for different kinds of users.

Group Manager 44 allows entities to create, delete and manage groups of users who need identical access privileges to a specific resource or set of resources. Managing and controlling privileges for a group of related people—rather than handling their needs individually—yield valuable economies of scale. Group Manager 44 meets a wide range of e-business needs: easy creation, maintenance, and deletion of permanent and ad hoc groups of users who may be allowed or denied access to particular resources; modification and adaptation of groups and their access privileges with minimal disruption to the directory server's underlying schema; efficient addition and deletion of users from established groups;

and delegation of administrative responsibility for group membership and subscription requests and approvals.

With Group Manager 44, companies (or other entities) can allow individual users to do the following: (1) self-subscribe to and unsubscribe from groups, (2) view the groups that they are eligible to join or have joined, and (3) request subscription to groups that have access to the applications they need. Multi-step workflows can then define which users must obtain approval before being added to a group and which can be added instantly. Group Manager 44 also lets organizations form dynamic groups specified by an LDAP filter. The ability to create and use dynamic groups is extremely valuable because it eliminates the administrative headache of continually keeping individual, static membership up-to-date. With dynamic group management features, users can be automatically added or removed if they meet the criteria specified by the LDAP filter. Dynamic groups also greatly enhance security since changes in user identities that disqualify someone from membership in a group are automatically reflected in the dynamic group membership.

The third application in the Identity System, Organization Manager 46, streamlines the management of large numbers of organizations and/or other objects within an e-business network, including partners, suppliers, or even major internal organizations such as sales offices and business units. Certain infrastructure security and management operations are best handled—or can only be handled—at the highest organizational unit level rather than at the individual or group level. Like User Manager and Group Manager, this application relies on multi-step workflow and delegation capabilities. Organization Manager handles the following administrative tasks: (1) organization lifecycle management, whereby companies can create, register, and delete organizations in their systems using customizable workflows; (2) maintenance of organization profiles on an attribute-by-attribute basis through self-service, delegated administration and system-initiated activities; (3) organization self-registration, whereby organizations such as business partners, customers and suppliers can self-generate a request to be added to the e-business network; and (4) creation of reusable rules and processes through multi-step workflows.

The various components of FIG. 1 can be implemented by software running on computing devices. Many different types of computing devices can be used, including servers, mainframes, minicomputers, personal computers, mobile computing devices, etc. Typically, such computing devices will have one or more processors that are programmed by code that is stored in one or more processor readable storage devices. The one or more processors are in communication with the processor readable storage devices, peripherals (e.g. keyboards, monitors, pointing devices, printers, etc.) and communication interfaces (e.g. network interfaces, modems, wireless transmitters/receivers, etc.).

The system of FIG. 1 is scalable. There can be one or many Web Servers, one or many Access Servers, and one or many Identity Servers. In one embodiment, Directory 36 is a Directory Server and communicates with other servers/modules using LDAP or LDAP over SSL. In other embodiments, Directory 36 can implement other protocols or can be other types of data repositories (e.g. relational database using SQL, etc.). Many variations of the system of FIG. 1 can be used with the present invention. For example, instead of accessing the system with a web browser, an API can be used. Alternatively, portions of functionality of the system at FIG. 1 can be separated into independent programs that can be accessed with a URL.

To understand how the system of FIG. 1 protects a resource, first consider the operation of unprotected resources with a typical unprotected resource. First, an end user causes his or her browser to send a request to a Web Server. The request is usually an HTTP request, which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory 36) can make informed decisions based on default and/or specific rules about whether to return requested resources to an end user. The rules are evaluated based on the end user's identity profile, which is managed by the Identity System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information. The received log-on information is then passed back to Web Server 18 and on to Web Gate 28. Web Gate 28 in turn makes an authentication request to Access Server 34, which determines whether the user's supplied log-on information is authentic or not. Access Server 34 performs the authentication by accessing attributes of the user's identity profile and the resource's authentication criteria stored on Directory 36. If the user's supplied log-on information satisfies the authentication criteria, the process flows as described below; otherwise, the end user is notified that access to the requested resource is denied and the process halts. After authenticating the user, Web Gate 28 queries Access Server 34 about whether the user is authorized to access the resource requested. Access Server 34 in turn queries Directory 36 for the appropriate authorization criteria for the requested resource. Access Server 34 retrieves the authorization criteria for the resource and answers Web Gate 28's authorization query, based on the resource's authorization criteria and the user's identity profile. If the user is authorized, the user is granted access to the resource; otherwise, the user's request is denied. Various alternatives to the above described flow are also within the spirit and scope of the present invention.

Authentication and Authorization decisions are based on policy domains and policies. A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. Policies are always attached to a policy domain and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated to determine whether the request should be allowed or denied; if there is not a match, then default policy domain rules are used.

Figure 2:
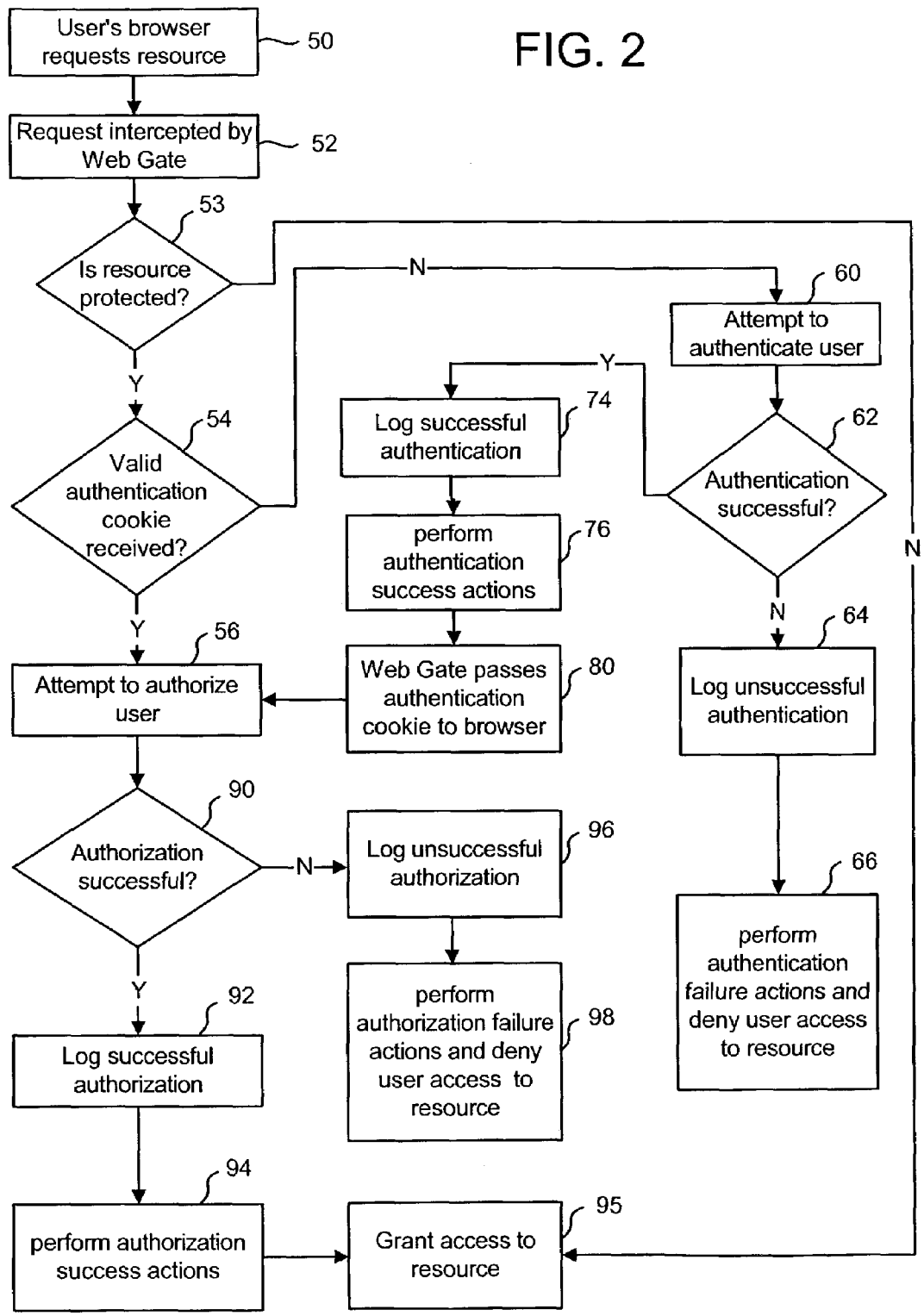
FIG. 2 is a flow chart describing one embodiment of a process for authenticating and authorizing.

FIG. 2 provides a flow chart for one embodiment of a: method for authenticating and authorizing. In step 50, a user's browser 12 requests a web-enabled resource 22 or 24. The request is intercepted by Web Gate 28 in step 52. The method then determines whether the requested resource is protected by an authentication and/or authorization rule in step 53. If the resource is not protected, then access is granted to the requested resource in step 95. If the requested resource is protected, however, the method proceeds to step 54. If the user has previously authenticated for a protected resource in the same domain, a valid authentication cookie is passed by browser 12 with the request in step 50. The authentication cookie is intercepted by Web Gate in step 52. If a valid cookie is received (step 54), the method attempts to authorize the user in step 56. If no valid authentication cookie is received (step 54), the method attempts to authenticate the user for the requested resource (step 60).

If the user successfully authenticates for the requested resource (step 62), then the method proceeds to step 74. Otherwise, the unsuccessful authentication is logged in step 64. After step 64, the system then performs authentication failure actions and Web Gate 28 denies the user access to the requested resource in step 66. In step 74, the successful authentication of the user for the resource is logged. The method then performs authentication success actions in step 76. In response to the successful authentication, Web Gate 28 then passes a valid authentication cookie to browser 12 (step 80), which stores the cookie. After passing the cookie in step 80, the system attempts to authorize in step 56.

In step 56, the method determines whether the user is authorized to access the requested resource. If the user is authorized (step 90), the method proceeds to step 92. Otherwise, the unsuccessful authorization is logged in step 96. After step 96, the method performs authorization failure actions (step 98) and Web Gate 28 denies the user access to the requested resource. If authorization is successful (step 90), then the successful authorization of the user is logged in step 92. Authorization success actions are performed in step 94. The user is granted access to the requested resource in step 95. In one embodiment of step 95, some or all of HTTP request information is provided to the resource. In one or more scenarios, the resource being accessed is the Identity System.

More information about authorization, authentication, an Access System and an Identity System can be found in U.S. patent application Ser. No. 09/998,908, "Support for Multiple Data Stores," filed on Nov. 30, 2001, which is incorporated herein by reference in its entirety.

Both the Identity System and the Access System make use of Directory 36. A unit of information stored in Directory 36 is called an entry or identity profile, which is a collection of information about an object. The information in an entry often describes a real-world object such as a person, but this is not required. A typical directory includes many entries that correspond to people, departments, groups and other objects in the organization served by the directory. An entry is composed of a set of attributes, each of which describes one particular trait of the object. Each attribute has a type, one or more values, and associated access criteria. The type describes the kind of information contained in the attribute, and the value contains the actual data.

An entry in the directory has a set of attributes that are required and a set of attributes that are allowed. For example, an entry describing a person is required to have a cn (common name) attribute and an sn (surname) attribute. One example of an allowed attribute may be a nickname. Any attribute not explicitly required or allowed is prohibited.

Examples of attributes stored in a user identity profile include: first name, middle name, last name, title, email address, telephone number, fax number, mobile telephone number, pager number, pager email address, identification of work facility, building number, floor number, mailing address, room number, mail stop, manager, direct reports, administrator, organization that the user works for, region, department number, department URL, skills, projects currently working on, past projects, home telephone, home address, birthday, previous employers and anything else desired to be stored by an administrator. Examples of attributes stored in a group identity profile include: owner, name, description, static members, dynamic member rule, subscription policies, etc. Examples of attributes stored in a user organization identity profile include: owner, name, description, business category, address, country, etc. In other embodiments, less or more than the above-listed information is stored.

Figure 3:
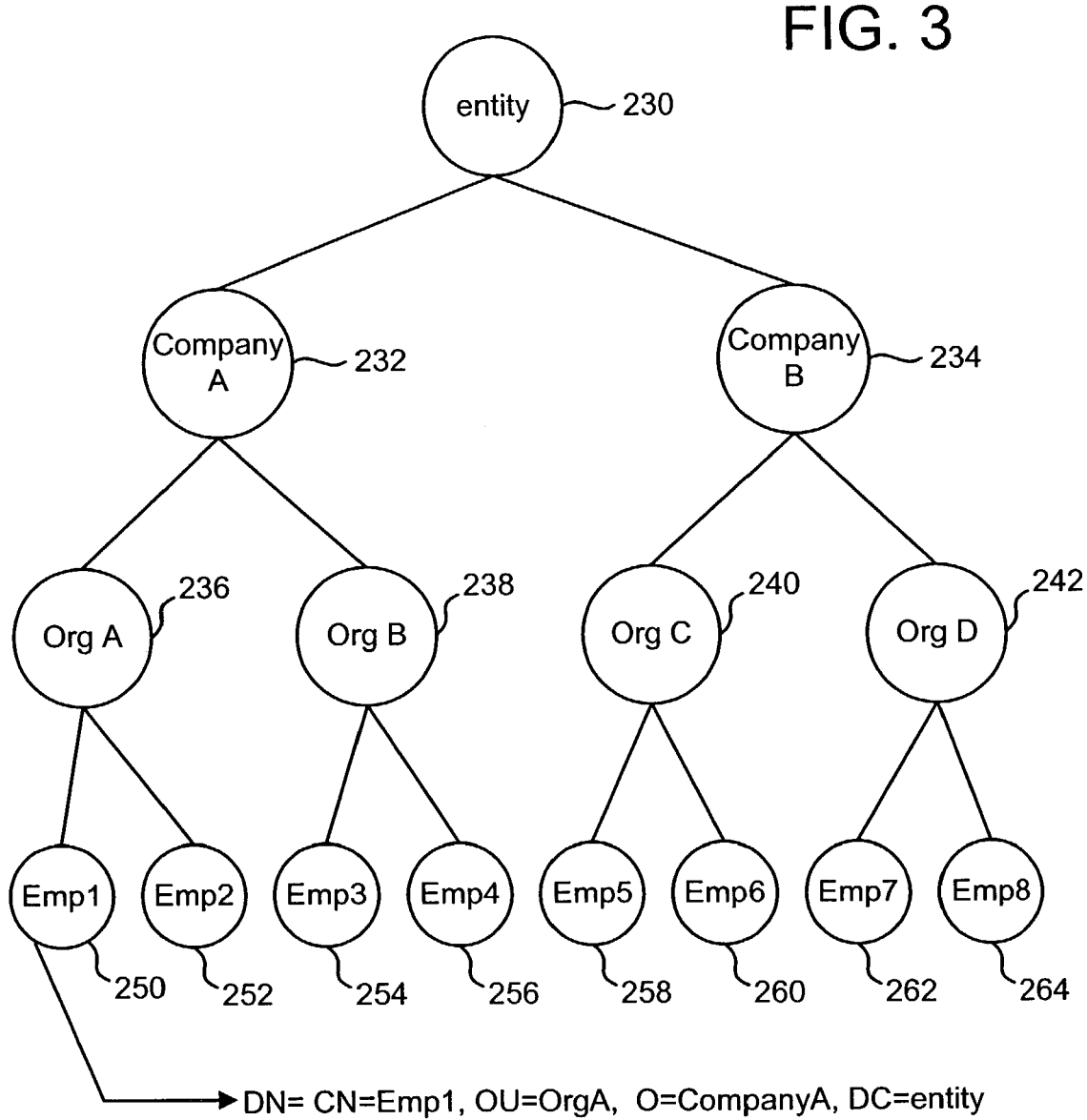
FIG. 3 is an example of a directory tree structure.

FIG. 3 depicts an exemplar directory tree that can be stored in Directory 36. Each node on the tree is an entry in the directory structure that includes an identity profile. In one embodiment, the entity can be a user, group or organization. Node 230 is the highest node on the tree and represents an entity responsible for the directory structure. In one example, an entity may set up an Extranet and grant Extranet access to many different companies. The entity setting up the Extranet is node 230. Each of the companies with Extranet access would have a node at a level below node 230. For example, company A (node 232) and company B (node 234) are directly below node 230. Each company may be broken up into organizations. The organizations could be departments in the company or logical groups to help manage the users. For example, FIG. 5 shows company A broken up into two organizations: organization A with node 236 and organization B with node 238. Company B is shown to be broken up into two organizations: organization C with node 240 and organization D with node 242. FIG. 5 shows organization A having two end users: employee 1 with node 250 and employee 2 with node 252. Organization B is shown with two end users: employee 3 with node 254 and employee 4 with node 256. Organization C is shown with two end users: employee 5 with node 258 and employee 6 with node 260. Organization D is shown with two end users: employee 7 with node 262 and employee 8 with node 264.

Each entity has a distinguished name (DN), which uniquely identifies the node. In one embodiment, each entry also has a relative name, which is different from all other relevant names on the same level of the hierarchy. In one implementation, the distinguished name (DN) comprises a union of the relative names up the tree. For example, the distinguished name of employee 1 (node 250) is DN=CN=Empl, OU=OrgA, O=CompanyA,
DC=entity, where:
DC=Domain Component
O=Organization
OU=Organizational Unit
CN=common name.

FIG. 3 shows a hierarchical tree. Some organizations employ fat or flat trees for ease of maintenance. A flat directory tree is a directory information tree that does not have any hierarchy. All of the nodes are leaf nodes (nodes without any child nodes). A fat directory tree is a tree that has a large number of nodes at any given level in a directory information tree. One advantage of a fat or flat tree is user maintenance.

For example, if an employee moves to a new group, the node must be moved to a new container if the tree is not flat or fat. By moving the node to a new container, the distinguished name for the node changes and all certificates become void. One drawback of flat or fat trees is that the organization loses the benefits of having a logical directory, such as using the logical directory to determine who has access to which nodes. To remedy this, the Identity System includes partition support for fat and flat tree directories using filters. From a configuration page, an attribute can be configured to be accessible (read, modify, etc.,) based on a two part filter. The first component in the filter identifies a top node in the directory. The filter will only apply to those entities at or below that top node. The second component of the filter is an LDAP filter which defines who can access the attribute. This two component filter can be applied on an attribute by attribute basis.

There are many ways for an entity to access and use the Identity System. In one embodiment, the entity can access the Identity System's services using a browser. In other embodiments, XML documents and API's can be used to access the services of the Identity System. For example, an entity can use a browser by pointing the browser to Identity Server 40. The user will then be provided with a login page to enter the user's ID, password, type of user and application requested (optional). Upon filling out that information, the user will be authenticated and authorized (by the Access System) to use the Identity System. Alternatively, the Access System can be bypassed (or there may be no Access System) and the Identity System authenticates the user.

As described above, the Identity System of FIG. 1 includes User Manager 42, Group Manager 44 and Organization Manager 46. User Manager 42 manages identity profiles for users. Group Manager 44 manages identity profiles for groups. Organization Manager 46 manages identity profiles for organizations and/or other objects. Each of these components will now be described in more detail.

Figure 4:
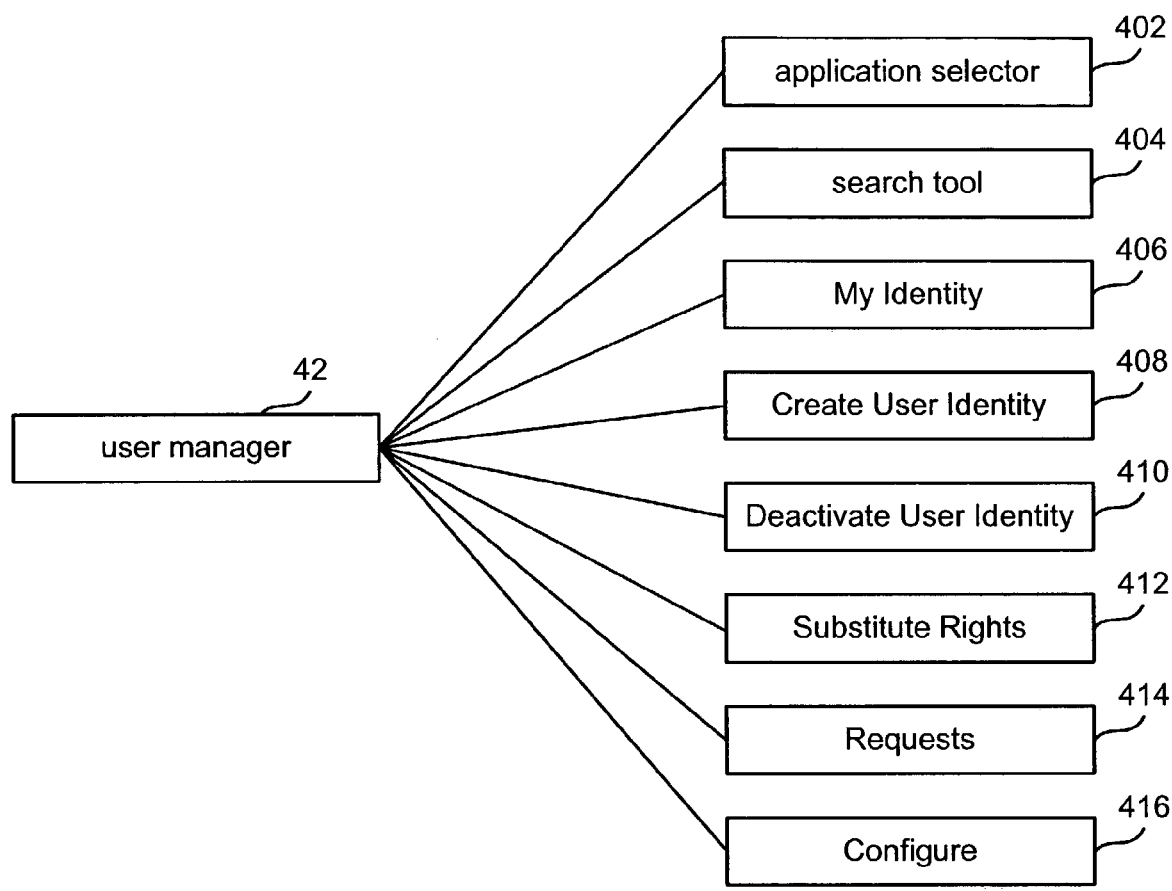
FIG. 4 is a block diagram describing the services of the User Manager.

FIG. 4 graphically depicts the various services provided by User Manager 42. Each of these services can be accessed from a User Manager home page. For example, in one embodiment, the home page will include an application selector 402, search tool 404, My Identity tab 406, Create User Identity tab 408, Deactivate User Identity tab 410, Substitute Rights tab 412, Requests tab 414 and Configure tab 416. Application selector 402 lets the user change applications from the User Manager to either the Group Manager, Object Manager or Publisher. In one embodiment, application selector 402 is a drop down menu. Search tool 404 enables a user to provide search information in order to search the directory for a set of one or more user identity profiles.

By selecting My Identity tab 406, a user is provided with the information stored in that user's identity profile. Create User Identity tab 408 allows a user with the appropriate privileges to create a new user identity profile (e.g. with a workflow). Deactivate User Identity tab 410 allows a user with proper privileges to remove an identity profile from the directory. Substitute Rights tab 412 allows the user to indicate who can proxy that user and allows the user to be a proxy for someone else. Request tab 414 allows a user to monitor workflows that are in progress or recently completed. Depending on the user's privileges, by selecting request tab 414, the user can see all workflows that involve that user, that are started by that user, that affect that user or that the user has privileges to view. Request tab 414 will indicate workflows for which there is an outstanding action to be done by the current user. The user can select that workflow and perform the task.

Configure tab 416 allows a user to configure various options for User Manger 42. The user must have sufficient privileges to access Configure tab 416. The user can perform attribute access control, delegate administration, define workflows and set the search base. Attribute access control includes controlling who has view and modify permissions for each attribute. Attributes can be set at any and all levels in an organization. The configuration also allows the specification of an e-mail notification list when a change to an attribute is requested. Delegation administration includes delegating administrative tasks to local administrators. An entity can choose what rights to delegate, whom to delegate to, and the scope to delegate. Workflow definition includes defining workflows for a particular organization, defining who will be responsible for the workflow actions and/or defining who will be receiving notifications for the workflow actions. Setting the search base includes setting the search base for a particular organization, person or set of persons. This will localize access to ensure security.

FIG. 5 depicts the various services provided by Group Manager 44. Once an entity is at the Group Manager home page, the entity can access the application selector 430, search tool 432, My Groups tab 434, Create Groups tab 436, Request tab 438 and Configure tab 440. My Groups tab 434 indicates the groups of which the entity is a member. By selecting any of the groups identified by My Groups tab 434 or Search Tool 432, the user will be provided with the identity profile page for that particular group. From the profile page, the group can be modified or deleted. Create groups tab 436 allows the user to create a new group. Request tab 438 provides the user with access to currently pending and recently finished workflows that involve groups. Configure tab 440 allows the user to configure various information about groups in the Group Manager. While viewing the identity profile for a group, the entity can modify that profile if the entity has appropriate privileges.

Configure tab 440 allows an entity to provide attribute access control, delegate rights, define workflows and expand dynamic groups. Attribute access control includes controlling who has view and modify permissions for each attribute in group identity profiles. Additionally, e-mail notification lists can be created which are used to notify entities when a change to an attribute is requested. Administration tasks can be delegated to local administrators. An entity can choose what rights to delegate, who to delegate to, and what the scope of the delegation is. Workflow definition includes defining the workflows for a particular group. This includes defining who is responsible for the workflow actions and who will be receiving notifications for workflow actions. Note that some of the tabs and services may not be available to all entities, depending upon the privileges of those entities.

The Group Manager also allows user to subscribe and unsubscribe themselves to groups. With sufficient privileges, users can also view/add/remove/search members of a group, FIG. 6 depicts the services provided by Organization Manager 46. Organization manager 46 provides functionality to create, modify, delete and manage organizational objects. From the home page for Organization Manager 46, a user is provided with an application selector 442, search tool 444, Create Organizational Profile tab 446, Request tab 448 and Configure tab 450. Application selector 442 allows the user to select a different application to access. Search tool 444 provides a user with the ability to enter search terms in order to search for one or more organizational objects. After performing a search, the user will be provided with a list of organizational objects meeting the search requirements. User can select any of these objects to view, modify or delete, if the user has sufficient privileges.

Create Organizational Profile tab 446 allows a user to create new organizational objects, if the user has sufficient privileges. Request tab 448 allows a user to access pending workflows and workflows that have recently been finished that relate to organizational objects. Access to Request tab 448 can be restricted and/or limited depending upon users privileges. If a user has a step to perform for a workflow, it will be indicated by Request tab 448.

Configure tab 450 allows the entity to perform attribute access control, delegate administration, define workflows and define container limits. Attribute access control includes controlling who has view and modify permissions for each attribute of an organizational identity profile. In addition, an entity can specify an e-mail notification list when a change to an attribute is requested. Delegating administration includes delegating administrative tasks to local administrators. An entity can choose what rights to delegate, whom to delegate to, and the scope of the delegation. Workflow definition includes defining the workflows for a particular organization, including who will be responsible for the workflow actions and who will be receiving notifications for the workflow. Container limits includes controlling how many objects can be created in an organization. This would also include defining who will be receiving notifications that a container limit has been met, has been violated or is close to being met.

More information about integrated. Identity and Access Systems can be found in U.S. patent application Ser. No. 09/793,658, "User Authentication," filed on Feb. 26, 2001, incorporated herein by reference in its entirety.

In one embodiment, each identity profile is an object stored in the directory. Each object is based on a class. When the system is configured, an administrator defines which class is to be used for users, which class is to be used for groups and which class is to be used for organizations. In one implementation there is one class used for users, one class for groups and one class for organizations. In other implementations, multiple classes could be used for each. Each class defines a set of attributes that can be used for that class. At installation, set-up, or at a later time, the required attributes for a class are configured.

Figure 7:
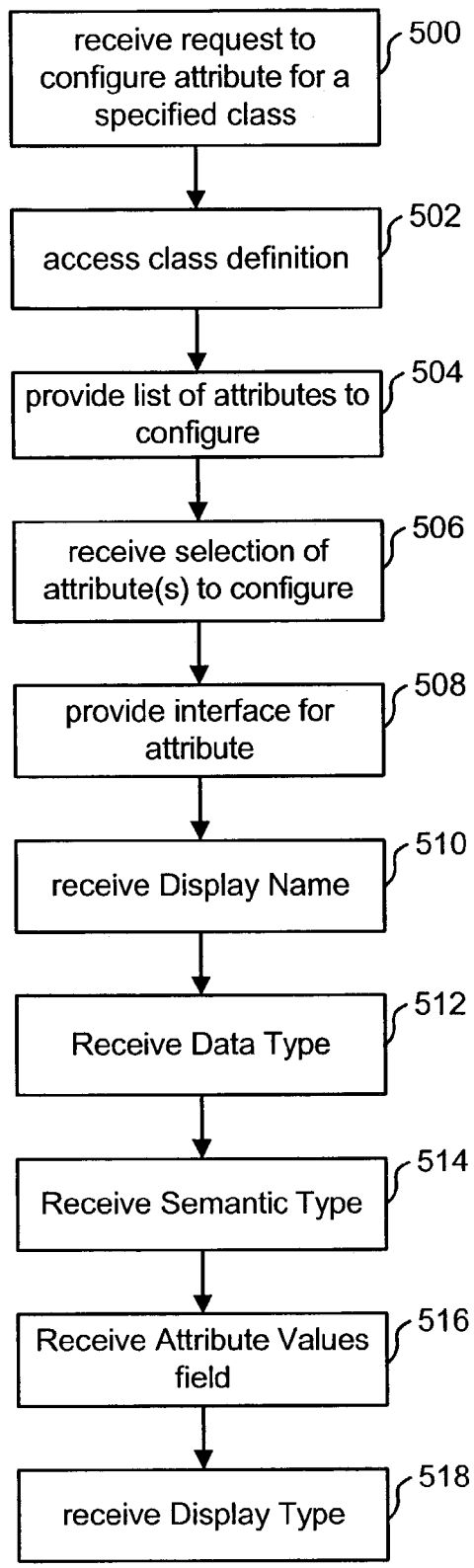
FIG. 7 is a flow chart describing one embodiment of a process for configuring an attribute.

FIG. 7 is a flowchart describing a process for configuring attributes of a class. While using the User Manager, a user can access a configure attributes page for the user class. While in the Group Manager, a user can access the configure attributes page for the group class. While in the Organizational Manager, a user can access the configure attributes page for the organizational class. In one embodiment, only users with appropriate access rights can configure or modify the attributes. In step 500 of FIG. 7, the system receives a request to modify the attributes for a specified class. That is, the user specifies a particular class the user wishes to modify and requests that the attributes be configured for that class. In one embodiment, step 500 includes selecting an attributes configuration tab, a button (with text box), or other selection device. In step 502, the Identity Server accesses the class definition of the specified class. In step 504, a list is provided of the attributes that can be configured. In one embodiment, next to each attribute will be a button that the user can select in order to configure that attribute. In step 506, the Identity Server receives a selection of which one or more attributes to configure. In step 508, an interface is provided for the attribute(s). This interface provides selection mechanisms (menus, check boxes, text fields, etc.) for configuring the attribute. In step 510, the system receives a Display name for the attribute. The Display Name is a user friendly name for the attribute. The Display Name appears on the appropriate application page (e.g. the User Manager). For example, for an attribute that stores a name of a department, the user may enter a display name of "Department Name." In step 512, a Data Type is received. That is, the user enters a type of data, for example, string, distinguished name, integer, telephone number, binary, or postal address. Other Data Types can also be used. In one embodiment, the data type is a read only field and cannot be configured by the user. In step 514, a Semantic Type is received from the user. A Semantic Type is an optional characteristic that governs the behavior of the attribute. In step 516, Attribute Values field information is received. In one embodiment, the Attribute Values field specifies whether the attribute can have a single or multiple values. In step 518, the interface receives the Display Type. The Display Type indicates how the attribute will be displayed. For example, an attribute can be displayed with as a selection menu, radio button, check box, image, etc.

In one embodiment, certain display types (for example, selection menu, radio button, and check box) allow (or some embodiments require) for the use of a filler, rule or list. In other embodiments, other display types can also allow for the use of a filter, rule or list to populate the attribute. A list is a static set of values. A filter is an LDAP (or similar) filter that is used to query the directory (or other data store) in order to build a list. For example, an administrator can create a filter to find every instance of objectClass=dialUpConnection and department=sales and build a list with the telephone numbers of the matching objects. A rule is a filter that includes dynamic substitution.

Figure 8:
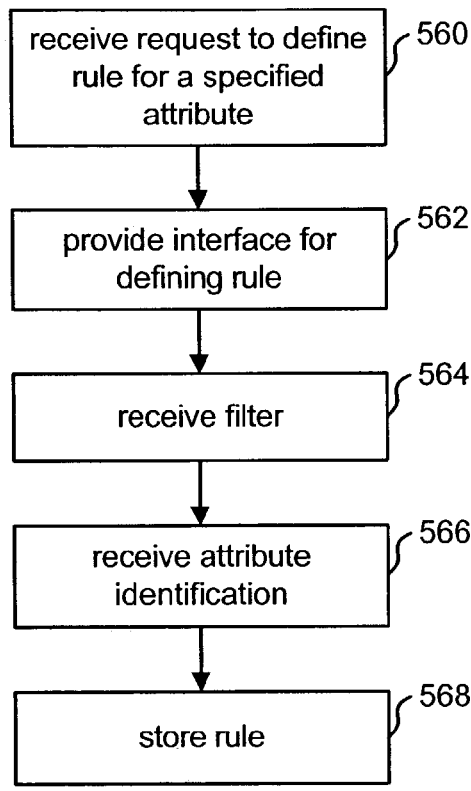
FIG. 8 is a flow chart describing one embodiment of a process for creating a rule.

FIG. 8 is a flowchart describing a process for defining a rule. The rule will be associated with an attribute of an object class. In step 560, the Identity Server receives a request to define the rule for a specified attribute in an object class. In one embodiment, while configuring the attributes of the object class, there will be a menu, check box, button, or other interface selection item for indicating that the user wishes to request a rule for the particular attribute in the particular class being configured. In step 562, an interface is provided for defining that rule. The user can then input information about the rule into the interface. The information inputted includes a filter and an attribute identification. In the filter field (step 564), the user enters a filter expression. The user can enter a plain filter or a rule. A rule is a filter that has dynamic variables. One example of a filter is as follows:

(&(objectClass=users)(OU=sales)(region=west))

Each of the variables (user, sales, west) are static variables that are typed explicitly. An example of a rule using dynamic variables is as follows:

(&(objectClass=users)(OU=$OU$)(region=$region$))

In the above rule, the variables $OU$ and $region$ are dynamic variables. The Identity Server will replace the dynamic variables with data based on the corresponding attributes in the identity profile. That is, a dynamic variable $OU$ represents the organization attribute for the identity profile under consideration. Therefore, $OU$ will be replaced in the rule with the actual value of the organization attribute for the identity profile under consideration. Similarly, $region$ will be replaced in the rule with the actual value of the region attribute in the identity profile under consideration. Note that $OU$ and $region$ are examples of abbreviations of attributes. Other abbreviations and attributes can also be used.

In step 566 of FIG. 8, the Identity Server will also receive an attribute identification. The attribute identification is the attribute to be reported from the profiles (or other objects) that match the filter. For example, if the attribute identification in the above listed dynamic rule is title, then for all of the user objects that have the organization equal to the organization attribute of the current identity profile under consideration and a region matching the region attribute of the current identity profile under consideration, the title for those objects will be reported. In step 568, the rule is stored by the Identity Server.

Figure 9:
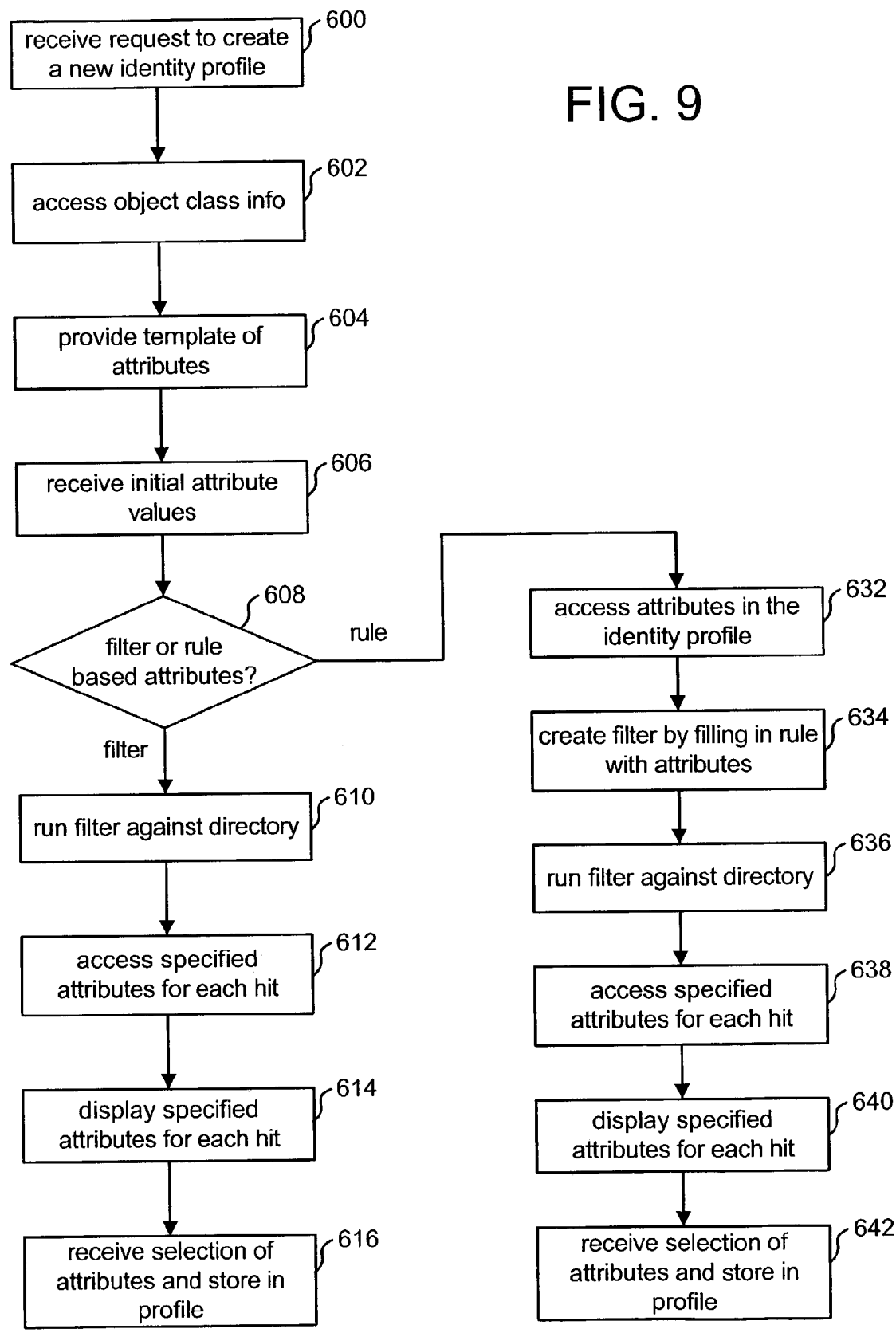
FIG. 9 is a flow chart describing one embodiment of a process for creating an identity profile.

Once an object class is configured, new objects can be created using that object class. Each of these new objects created is an Identity Profile stored in the Directory server (or other data store). FIG. 9 is a flowchart describing one process for creating an identity profile. The process of FIG. 9 uses one aspect of the present invention for automatically populating data into the identity profile based on other attributes. That is, based on inputting data for a first set of one or more attributes, a second set of one or more attributes can automatically be populated or populated semi-automatically. By semi-automatically, it is meant that based on the first set of attributes, a set of choices can be provided to the creator of the identity profile. For example, based on the value of the user's organization and region, a rule can be set up to automatically determine which potential managers are for new employee. Each of the potential managers can be displayed to the entity creating the identity profile and the entity can choose the appropriate manager from that list.

In step 600 of FIG. 9, the Identity Server application (e.g. User Manager, Group Manager, Organization Manager, or other) receives a to request to create a new identity profile. In one embodiment, the request includes an identification of the class to be used to create the object. In step 602, the appropriate class (also called a class definition) is accessed. In step 604, a template is provided to the requester. This template provides an indication of the attributes that need to be filled in. In step 606, an initial set of attribute values are received. As described above, some attributes can be filter-based attributes and other attributes can be rule-based attributes. In step 608, it is determined whether there are any filter-based or rule-based attributes. If there are filter-based attributes, steps 610-616 are performed for the filter-based attributes. If there are rule-based attributes, steps 632-642 are performed for the rule-based attributes.

In step 610, the filter for the attribute is run against the directory. That is, the filter statement is used to perform a query to find the appropriate objects in the directory.

In step 612, the attribute specified (see step 566) is accessed for each object returned in the result set of step 610. In step 614, each of the attributes accessed in step 612 are displayed. In step 616, one or more of the attributes are selected by the user for storage in the identity profile. For example, as discussed above, the filter may be used to access a list of potential managers. In one embodiment of step 616, the person creating the object may choose one or more of the managers. The name of the chosen manager is then stored in the manager attribute. In other embodiments, the choice may be made automatically, or all of the returned managers can be automatically chosen. Note that the data that is searched in the directory in step 610 can be data for the application being used to create the identity profile or can be for another application that also uses the directory store. In other embodiments, the filter can be run against a different data store.

Steps 632-642 are used for attributes that are based on rules. In step 632, the Identity Server accesses the attributes that are specified in the rule using dynamic variables. That is, the rule may include one or more dynamic variables. Each of the dynamic variables specifies an attribute in the identity profile under consideration. Step 632 includes the Identity Server accessing the actual values of the attribute specified by the dynamic variable. Thus, if the dynamic variable is $OU$, then the Identity Server will access the attribute OU (which is Organizational Unit). In step 634, the data accessed from the attributes in the previous step will be applied to the rule. That is, a filter will be created by replacing the dynamic variables with the data from the accessed attributes. In step 636, the filter will be run against the directory (or other data store). This is similar to step 610. The result of the query is a result set. Each of the items in the result set will be accessed in step 638 in order to read the specified attribute (see step 566) for that particular entry. The specified attributes of the result set are displayed in step 640. One or more of the displayed attributes can be selected in step 642 for storage in the identity profile. In other embodiments, there is no selection of attributes. Rather, they automatically populate the identity profile.

One example of using rules to provide additional information into an identity profile is to provide a list of potential managers, as discussed above. An example of such a rule to do so could be as follows:

(&(objectClass=users)(OU=$OU$)(region=$region$)
(title=Manager))

With this rule, the attribute specified in step 566 would be the names or distinguished names of the person associated with the objects in the result set.

Another example may be to identify certain business partners to be associated with a user. To do so, an administrator may use the following rule:

(&(objectClass=partners)(OU=$OU$)
(region=$region$))

With this rule, the attribute configured in step 566 may include the name or distinguished name of the partner. Note that the object class is set to "partners." In one embodiment, it is contemplated that there will be an object class for storing information about each of the business partners. All of the objects created for that object class will be searched to find the appropriate objects having the same organizational unit and region as the identity profile under consideration. For those that meet the test, the name stored in those identity profiles will be reported and used to populate the Business Partners attribute of the identity profile being created or modified.

A lot of the tasks that are performed in the Identity System are accomplished using workflows. A workflow is a predefined set of steps that perform a specific task, where information or tasks are passed between participants and programs according to a defined set of rules. One embodiment of the present invention supports the following types of workflows: create object; delete object; change the value of attributes; and certificate issuance, revocation and renewal. In one embodiment of the present invention, a user is required to create a workflow to create or delete an object, change the value of an attribute or implement certificates. Workflows ensure that an organization's guidelines for performing a task are met. Workflows can be defined in the User Manager, Group Manager or Organization Manager. Each workflow has two or more steps, including one to start the action and one to implement or commit it. Each step can contain an action, send e-mail notifications to selected persons and start the next step if its entry conditions are satisfied.

Table 1 provides examples of different tasks that can be performed with workflows in the appropriate applications:

TABLE 1

| Application | Workflow Tasks |
| --- | --- |
| User Manager | Create User |
| | Delete User |
| | Change Attribute |
| | Certificate Enrollment |
| | Certificate Renewal |
| | Certificate Revocation |
| Group Manager | Create Group |
| | Delete Group |
| | Change Attribute |
| Org. Manager | Create Object |
| | Delete Object |
| | Change Attribute |

Each workflow includes two or more steps. Each step can include one or more actions. Table 2, below, provides examples of different actions that can be performed with various types of workflows:

TABLE 2

| Workflow Type | Actions |
| --- | --- |
| Creating object | Initiate |
| | Self Registration |
| | Provide Information |
| | Approval |
| | Provide Information and Approval |
| | Activate |
| | Commit |
| | Error Report |
| | External Action |
| Deleting object | Initiate |
| | Change Information |
| | Approval |
| | Change Approval |
| | Deactivate |
| | Commit |
| | Error Report |
| | External Action |
| Changing Attribute | Request |
| | Approval |
| | Provide Information |
| | Provide Information and Approval |
| | Commit |
| | Error Report |
| | External Action |

Table 3 provides a description of the various actions:

TABLE 3

| Action | Description |
| --- | --- |
| initiate | This action initiates workflows. Required, option, and supplied attributes may be configured for this action. Based on the relevant data configured in the step, the action will compose a page for the user to fill in the required information and to add additional attributes for provisioning (supplied variables) if so desired. Once the page is submitted, the workflow engine will trigger the Change Attribute workflows for the supplied attributes. People who are configured as a participant for this action and its corresponding workflow will see the "Create Profile" or "Initiate Deactivate User" button. |
| self_registration | This action allows an e-user to fill in a registration form and submit it for acceptance. The required information will be displayed on the page. It is envisioned that self-registration will be used before the user has access to an application. Therefore, the UI of this page will be designed without the context of an application and with credentials for authentication. |
| request | This action makes a request for change/add/delete attribute. People who are configured as a participant for this action and its corresponding workflow will see the "Request to Modify" or "Request to Remove" button on the profile page (during "modify" mode). |
| provide_info | This action is similar to initiate, in that it collects information from the user and triggers other workflows, if necessary. It is treated as a different action from initiate for the following reasons: Initiate is always the first action in the workflow. Provide_info can occur at multiple places in a workflow while initiate can not. The people who can initiate the workflow may be different from those who can provide intermediate information. Only the people configured as the participants for the initiate action will see the "Create Profile" button. Provide_info will try to retrieve the required attributes to display the values to the user. This allows the information setup in the previous steps or in the directory to be changed. |
| change_info | This action is identical in behavior to provide_info. A different name is used because the name change_info makes more sense in the case of deactivating. |
| approval | This action can be configured with only the required attributes. At run time, the values of the required attributes will be presented to the user to get approval. No information is supposed to be changed. The only user action allowed is to click on the button to indicate approve or reject. In other embodiments, a digital signature could be used to provide a nonrepudiation approval. |
| Provide_info and approval | This action combines the provide_info and the approval into one action. In some situation, customers may want the people who can approve also to be able to provide or change the information if necessary. |
| change_approval | This action is identical in behavior to provide_approval. A different name is given to reflect the nature of the action in the deactivating context. |
| activate | This action enables the user to explicitly mark an entry ready. Until this action is performed, the user's entry has been marked as "PendingActivation." Upon completing this action, the status will be changed to "Activated." Once "Activated," this user entry may be used for authentication to the system. |

TABLE 3-continued

| Action | Description |
| --- | --- |
| deactivate | This action is the counterpart of the activate action to mark an entry suspended. Until this action is performed, the user's entry has been marked as "Pending for Deactivation." Upon completing this action, the status will be changed to "Deactivated." In both of these cases, this entry will not be recognized as an authorized user in the system. |
| commit | This action writes the information collected this far in the previous workflow steps to the directory. Commit can be done multiple times. The location of the write is the user's permanent location as selected in the "initiate" step. |
| error_report | This action is to report for a background process. When a background process encounters a processing error, it has no proper way to report the error since there is no responsible person for the action. The workflow definer can configure the failed path to this error_report step, so that the error can be designated to the responsible individuals. |
| external_action | External action can be plugged into the workflow as a distinct step. |

Workflows are created based on templates (forms) by users with sufficient privileges. In one embodiment, each template has at least four sections including a section for creating objects, deleting objects, changing attributes and working with certificates. The template provides parameters that define how workflows can be created. Templates can be edited in order to tailor the workflow definition processes. The User Manager, Group Manager and Organization Managers each have their own template files and use those template files to control and define the workflow definition process. In one embodiment, the template file is an XML document that defines a set of parameters for each of the actions available to that particular workflow type. Table 4 describes the various parameters that are used in the template files:

TABLE 4

| Parameter | Description | Sample Setting |
| --- | --- | --- |
| occurrence | Indicates how many times this action may be used within a workflow. | [1][n]<br>1—action can be used once.<br>n—action can be used multiple times. |
| useraction | Indicates whether or not the step is interactive. | [true][false]<br>True—action requires user interaction.<br>False—this is a background step and requires no user interaction. |
| forceCommit | Indicates whether an implicit commit takes place for this step, even though this action is not a commit. An implicit commit writes all collected data to the specific target entry. | [true][false]<br>True—implicit commit takes place.<br>False—implicit commit does not take place. |

TABLE 4-continued

| Parameter | Description | Sample Setting |
| --- | --- | --- |
| pre_action | Indicates that the current action can be specified if the previous step's action is in this list. | [list of actions] |
| exit_condition | Indicates the possible results for the given action. | [list of exit conditions]<br>For example:<br>true: 1<br>false: 0 |
| relevant_data | Indicates which types of relevant data can be configured for this step. Background steps do not contain any relevant data. | [list of relevant data}<br>Can be any combination of Required, Optional, or Supplied. |

Below is a generic form of a template. In the left hand margin is a letter to identify each line of the template for explanation purposes:

Generic Template

©Oblix, Inc., 2001

```
a    <CompoundList ListName = "[workflow type]">
b      <CompoundList ListName = "[action]">
c        <SimpleList>
d          <NameValPair ParamName="occurrence" Value=[value]/>
e          <NameValPair ParamName="useraction" Value=[value]/>
f          <NameValPair ParamName="forceCommit" Value=[value]/>
g        </SimpleList>
h        <ValList ListName="pre_action">
i          <ValListMember Value = "[action]"
j          ...
k        </ValList>
l        <ValNameList ListName="exit_condition">
m          <NameValPair ParamName = "true" Value="0"/>
n          <NameValPair ParamName = "false" Value="1"/>
o        </ValList>
p        <ValList ListName="relevant_data">
q          <ValListMember Value = "required">
r          <ValListMember Value = "optional">
s          <ValListMember Value = "supplied">
t        </ValList>
u      </CompoundList>
       [more definitions of actions]
v    </CompoundList>
```

The first line labeled (a) indicates the workflow type, which includes creating an object, deleting an object, changing attribute or certificates. Lines (b-u) define the parameters for one particular action. One or more of the parameters described above are defined in lines (b-u) for one action. For example, line (d) puts a value into the occurrence parameter, line (e) provides a value for a user action and line (f) provides a value for forceCommit. Lines (h-k) provide the various pre-actions that have to occur before the particular action is performed. Lines (l-o) provide exit conditions. While the generic template above shows line (b-u) for one particular action, a typical template would have parameters for many actions. One template is likely to be used to create many workflows.

Figure 10:
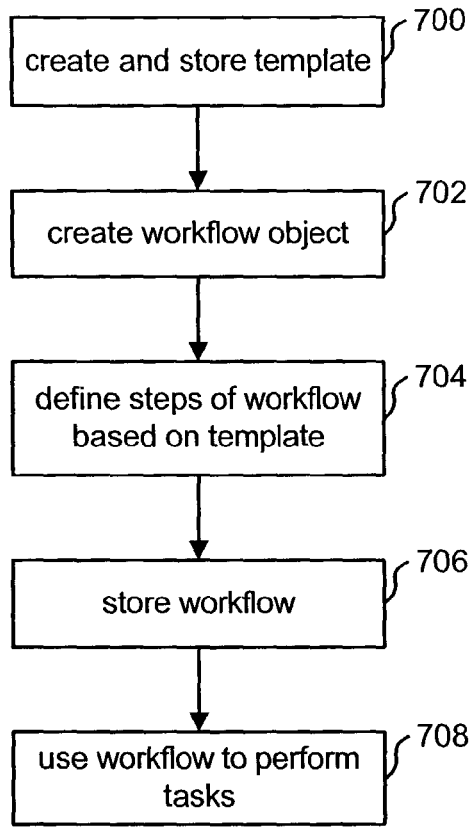
FIG. 10 is a flow chart describing an overview of a process for creating and using workflows.

FIG. 10 is a flowchart providing an overview of the process for creating a workflow. In step 700 a template is created and stored. In one embodiment, the template can be created using a word processor. In step 702, a workflow object is created. The workflow can be created using the User Manager 42, Group Manager 44 or Organization Manager 46. In step 704, the steps of the workflow are defined based on the template created in step 700. In step 706, the workflow is stored. In step 708, the workflow is performed. Additional workflows can be created by performing steps 702-708 because once a template is created, it can be used to create many workflows.

Figure 11:
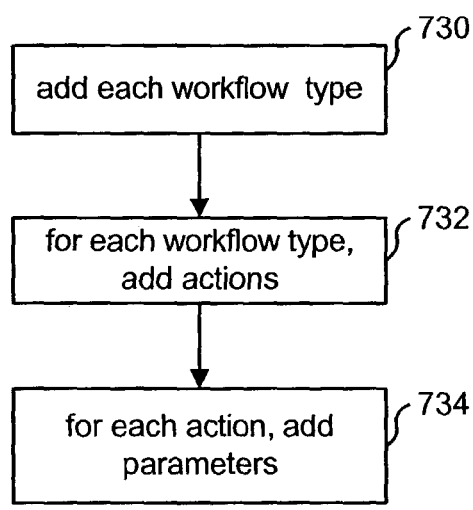
FIG. 11 is a flow chart describing one embodiment of a process for creating a template.

FIG. 11 is a flowchart describing the steps of creating a template. In step 730, each workflow type is added to the template file. In reference to the generic template above, line (a) of the generic template identified the first workflow type. It is likely that the workflow types would include create object, delete object, change attributes and certificates. In step 732, for each workflow type, actions are added. Code for one action is depicted above in the generic template. In step 734, for each action the parameters are added. In one embodiment, one or more domains can be specified for a template or for workflow types in the template. If domains are specified, then the associated template or workflow types only apply to workflows created for the specified domain(s).

Figure 12:
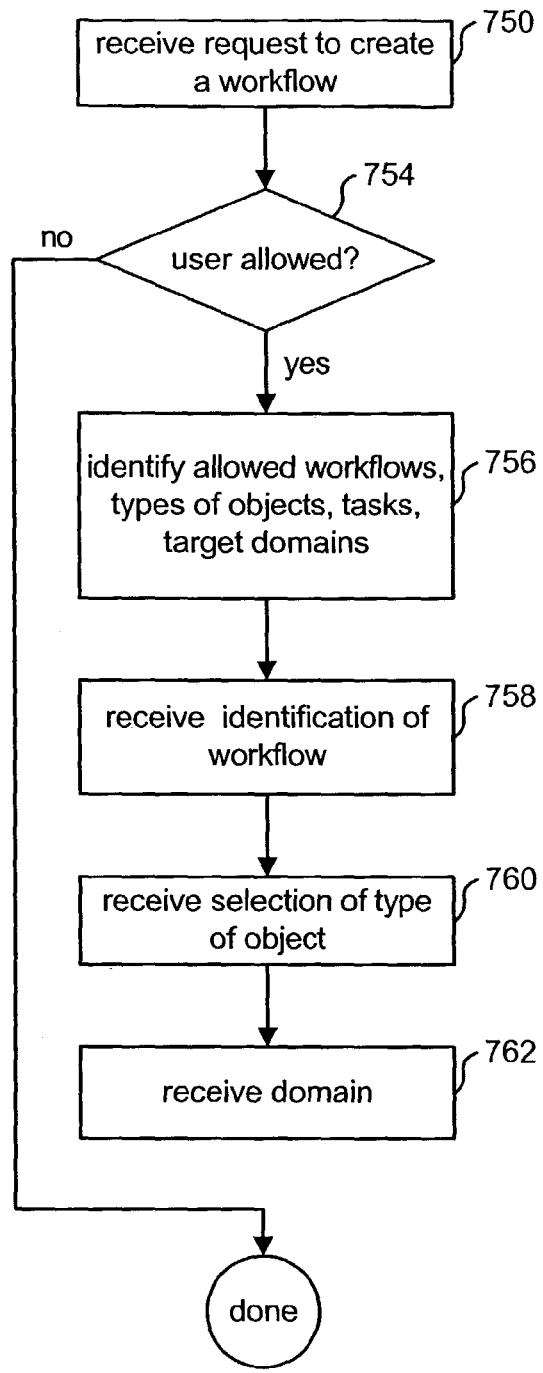
FIG. 12 is a flow chart describing one embodiment of a process for creating a workflow.

FIG. 12 provides a flowchart for creating a workflow object (step 702 of FIG. 10). In step 750, the appropriate manager (User, Group, Organization) receives a selection or indication to create a workflow. In step 754, it is determined whether the user is allowed to create the workflow. If no, the process is completed. If yes, the system identifies the different types of workflows, objects, tasks and target domains for which the user can create a workflow (step 756). In step 758, the user selects the identification of the workflow to be created. The identification is just a unique name to identify the workflow. In step 760, the user inputs a selection of the type of workflow based on the options from step 756. Step 760 includes choosing the task that the workflow will perform. For example, in the User Manager, the possible tasks include create a user, delete a user, change attribute, etc., as discussed above. In step 762, the user specifies the domain in the directory to associate with the workflow.

Figure 13:
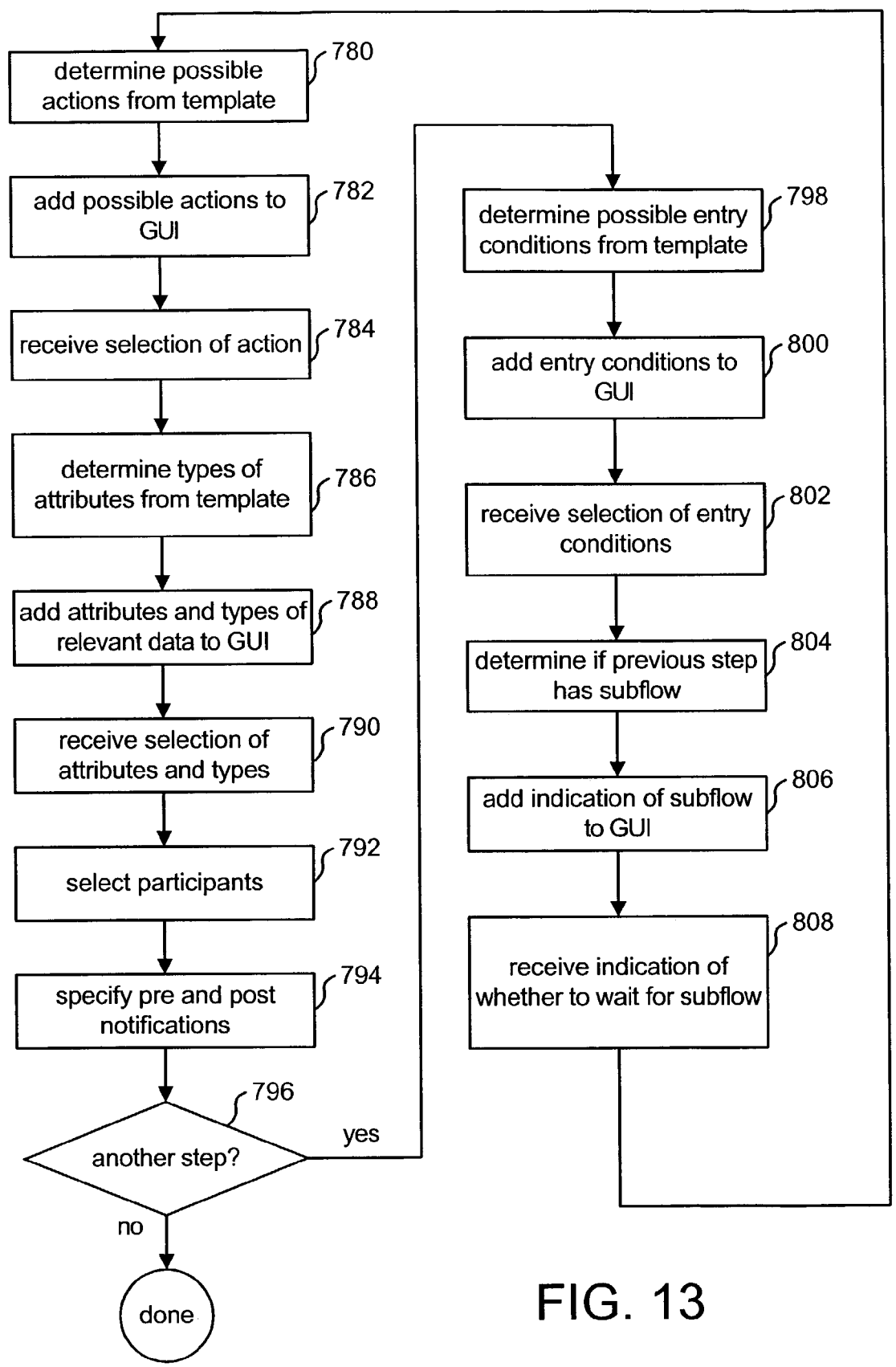
FIG. 13 is a flow chart describing one embodiment of a process for defining steps for a workflow.

FIG. 13 is a flowchart describing the process of defining steps for a workflow being created (see step 704 of FIG. 10). The process of FIG. 13 is performed based on the template. In step 780, the system determines the possible actions that can be performed for this particular workflow based on the template. That is, the system reads the template and determines which actions can be used. The actions that can be selected are added to a GUI in step 782 and, in step 784, a selection from the GUI is made by the user. In step 786, the system determines which types (required, optional, supplied) of attributes are available, based on the template. The appropriate attributes and types of attributes are added to the GUI in step 788.

In step 790, the system receives a selection of the attributes and the types from the user. That is, the user will select which attributes are optional, which attributes are required and which attributes are supplied. An attribute is supplied if it is provided from another workflow. In other embodiments, other types can be used. In step 792, the participants who can perform the current step being defined are identified. In step 794, pre and post notifications are specified. A pre-notification means that prior to the step being performed the following set of users are sent an e-mail (or other form of communication). Post notification means that after the step has being completed the following individuals are sent an e-mail (or other form of communication).

If there is another step in the workflow (step 796), then the method loops to step 798; otherwise, the process of FIG. 13 is completed. In step 798 the possible entry conditions are determined from the template. In step 800, these entry conditions are added to the GUI. In step 802, a selection of the entry conditions is made from the GUI. In step 804, the system determines if the previous step has a subflow. If so, the user has an opportunity to indicate whether to prevent the initiation of the current step until the subflow is completed. Determination of whether there is a subflow can be based on the template or based on the types of data in the previous step (e.g. is there supplied data). If there is a subflow (or multiple subflows), then indication of the subflow(s) is added to the GUI in step 806. In step 808, the system receives an indication from the GUI whether the current step should wait for the previous step's subflow(s) to complete. This indication to wait for subflows is stored as a flag with the data for the workflow. After step 808, the method continues at step 780.

In one alternative, each subflow (for a step that has multiple subflows) can be associated with a separate entry condition. In such an embodiment, the user can individually select whether to wait for each subflow A subflow is a workflow that is initiated by another workflow. The concept of subflow was introduced and implemented to reduce administrative work. If a workflow already exists to perform a task, any other workflow that needs to perform that task should be able to leverage off the first workflow. When creating a workflow, an indication that there is a sub-workflow is provided by the creator of the workflow when the creator indicates that one or more of the variables are supplied.

The workflow that initiates the subflow is referred to as the parent workflow. A workflow can be both a parent workflow to a first workflow and a subflow to a second workflow. The parent workflow may or may not wait for the subflow, as defined in the workflow creation. Consider the following example, a company uses a first workflow to create new users for the Identity System and add the new user's identity profile to the directory. As part of its process, the new user workflow obtains the new user's telephone number. The obtaining of the new user's telephone number is accomplished by performing a new telephone number workflow. In this example, the new telephone number workflow is initiated by a step in the new user workflow. Therefore, the new telephone number workflow is a subflow of the new user workflow. In one alternative, the new telephone number workflow can also call a subflow, for example, to get a new telephone line connected and operational. This, second subflow can also call a subflow, and so on. There can be many levels of nesting of subflows. Additionally, a parent workflow can have many subflows.

In one embodiment, a parent workflow and its subflows must all be performed by the same application. For example, the all must be performed by the User Manager. Or, they must be performed by the Group Manager, etc.

FIG. 14 is a flowchart describing one embodiment of a process for identifying which participants may perform an action. That is, FIG. 14 provides more detail about step 792 of FIG. 13. The process of FIG. 14 can also be used to identify who should receive pre and post notifications. One embodiment of performing FIG. 14 includes providing an interface to enter information. In step 820, the system provides an ability to enter a name. In step 822, the system provides an ability to enter identification of one or more groups. In step 824, the system provides an ability to enter a filter. In step 826, the system provides an ability to enter rules based on attributes in an identity profile. In one embodiment, steps 820-826 are performed concurrently in the same interface. In other embodiments, they are performed separately. In step 828, the system receives the identification of the participants. That is, the user either enters a name, a group, a filter, or a rule. In step 830, the name, group, filter or rule is used to identify the participants. If a filter is provided, that filter can be used to perform a query that is run against the directory in order to identify those objects (identity profiles) that meet the filter. If a rule is used, the dynamic variables of the rule are replaced with data for one or more attributes of the identity profile under consideration to create a filter, and that filter is used to perform a query against the directory to identify one or more objects. In one embodiment of step 830, the participants can be identified immediately. For example, if the user provided identification of the participants by identifying the name, group or filter, that information can be used immediately to identify the participants. If the identification of participants is being done by a rule, then step 830 cannot be performed until the appropriate attributes are entered into the identity profile. In some cases, the appropriate attributes will not be entered into the profile until the performance of the workflow.

Figure 15:
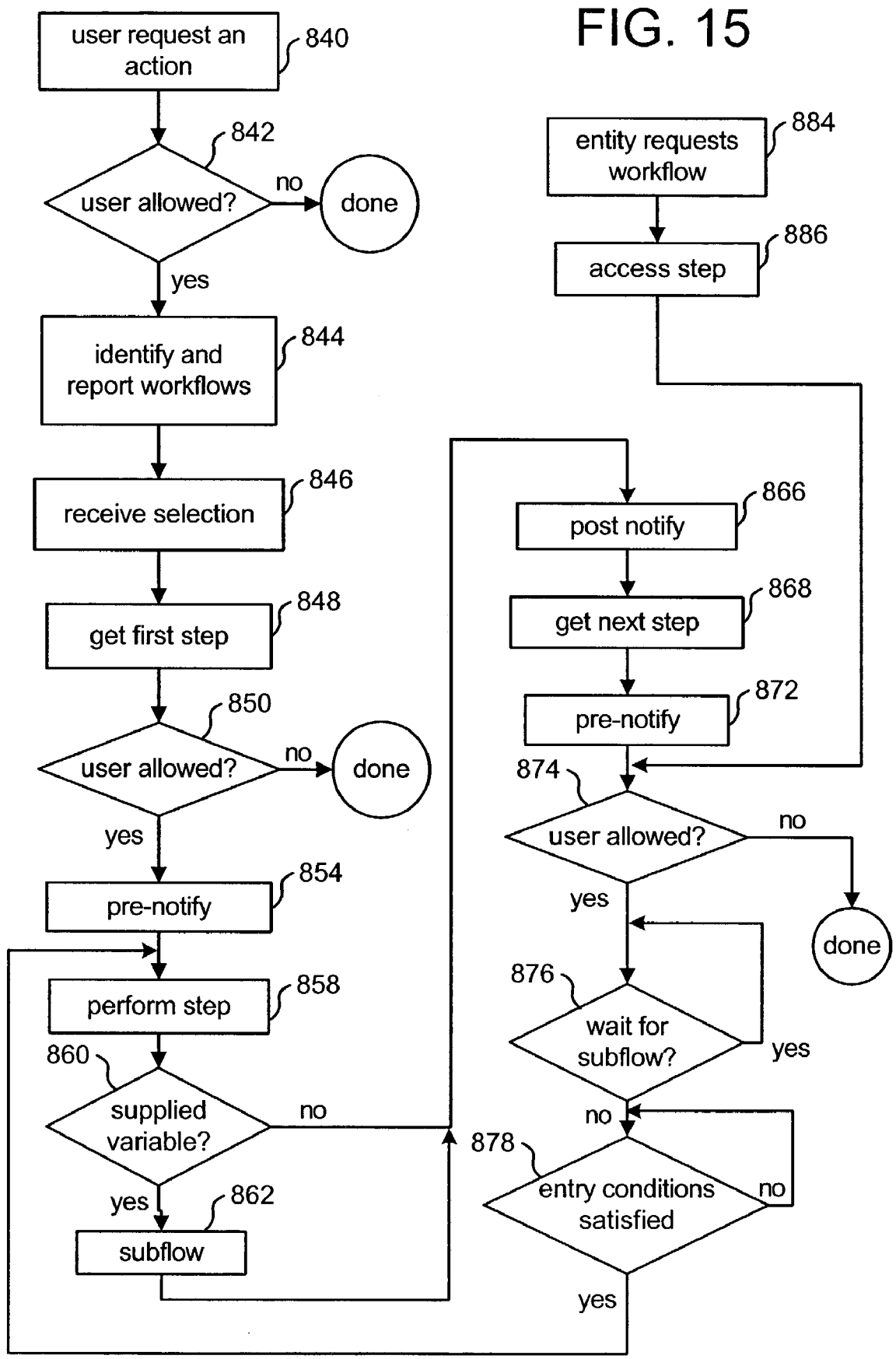
FIG. 15 is a flow chart describing one embodiment of a process for using a workflow.

FIG. 15 is a flowchart describing the process of using a workflow. The process of FIG. 15 is performed, for example, when creating a new user, a new group, etc. In step 840, the relevant manager (e.g. User Manager, Group Manager or Organization Manager) receives a request to perform an action that requires a workflow. In step 842, it is determined whether this user is allowed to initiate the workflow. If not, the process of FIG. 15 is completed. If so, the GUI determines and reports a set of one or more workflows. This set of one or more workflows meets three criteria: (1) the user is allowed to use the workflows, (2) the workflows perform the requested task and (3) the workflows are associated with a domain that includes the target of the task. For example, if user A has requested to modify the attributes of Employee 8 (identity profile 264 of FIG. 3), then the system will identify and report workflows that (1) user A has permission to access, (2) perform attribute modification and (3) are associated with a domain that includes identity profile 264 of FIG. 3. In one embodiment, the identified workflows are displayed in a menu.

In some situations, a workflow is requested without knowing the location of the target identity profile (e.g., the identity profile being created). For example, a user can request to create an object without indicating where to store the object in the directory. In such a scenario, the system will find and report workflows that perform the requested task and can be accessed by the user. When the system reports the list of workflows (e.g. via a GUI), the system will also report the domain associated with each workflow. In this situation, step 846 includes the system receiving a selection from the user of the workflow desired, and the domain to operate on.

In step 846, the system receives a selection from the user of the work flow desired. Note that if step 844 only identified one workflow, then step 846 can be skipped or performed automatically. In step 850, it is determined whether the user is allowed to perform this workflow step. If not, the process of FIG. 15 is completed, at least temporarily. One embodiment of the process of FIG. 15 does not include step 850.

In step 854, pre-notifications, if any, defined in the workflow are sent out. In step 858, the current step of the workflow is performed. For example, an action is performed In step 860, it is determined whether there are supplied variables. When creating a workflow, the creator had the option of defining the types of variables. Supplied variables are those variables whose value will be supplied by a subflow. If the current step has a supplied variables, then the system searches for any workflows that can supply the variable and apply to the appropriate domain. If only one workflow is found for each supplied variable, then those workflows are initiated as a subflow in step 862. If multiple workflows are found for a particular supplied variable, then the user is given a choice and the chosen workflow is initiated as a subflow in step 862. Note that the subflow could itself have a subflow, which could itself have a subflow, and so on. There is no limitation on the number of subflow nestings.

If there are no supplied variables, or after the subflow(s) are started, then post step notifications are sent out, if any, in step 866. In step 868, the next step is accessed from the workflow definition. If there are no more steps, then the process of FIG. 15 is completed In step 872, pre-notifications are sent out.

In step 874, the system determines whether the user is allowed to perform the next step. If not, the process of FIG. 15 is stopped. If so, the system determines in step 876 whether it has to wait for the subflow(s). In one embodiment, a flag is set at workflow creation time to indicate that the workflow should wait or not wait. If there is a subflow and the current workflow has to wait, the system continues to wait until the subflow is completed. If there is no subflow or it does not have to wait, then the system determines whether all entry conditions have been satisfied in step 878. If not, the system waits for the entry conditions to be satisfied. If yes, the process continues to step 856.

Note that different steps may be set up for performance by different users. Thus, a first user may start the workflow but a different user or a different set of users may be needed for intermediate or later steps. Therefore, the process of FIG. 15 performed by the initial user may temporarily halt. As described above, if another user is needed to perform a step, that user will be notified either by e-mail, through one of the request tabs discussed above or another means. When that user desires to perform the step, the user will request access to the workflow in step 884 of FIG. 15. For example, the user can respond to a link in an e-mail or select a workflow listed in one of the request tabs. In step 886, the step for that particular user is accessed, and then the method continues with step 874 of FIG. 15.

Figure 16:
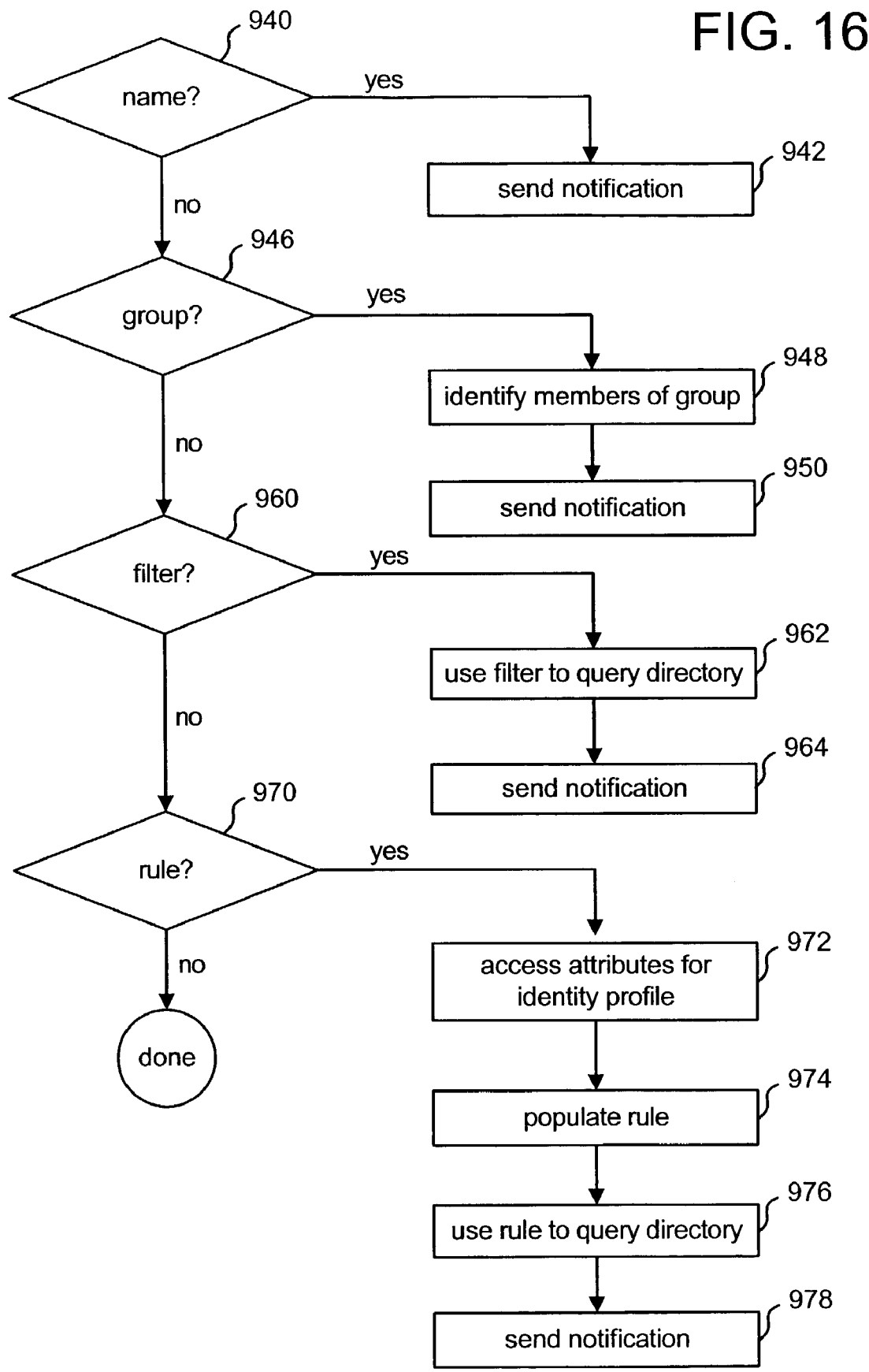
FIG. 16 is a flow chart describing one embodiment of a process for notifying an entity.

FIG. 16 is a flowchart describing one embodiment of a process for notifying an entity. That is, the process of FIG. 16 explains how the pre-notify and post-notify steps of FIG. 15 are performed. In step 940, it is determined whether the participants to notify have been specified by name. Participants can be specified by name, group, filter, or rule. If the participant is specified by a name, then a notification is sent to that participant in step 942. The system has the name of the person, and they can access the appropriate information about the person to send the appropriate notification. For example, if the notification is a telephone call, the system will access the telephone number in the identity profile for that person and make the phone call. Similarly, the system can access the user's identity profile to access an e-mail address to send an e-mail, post office address to send a letter, pager number to send a page, etc. If the participant was not specified by a name, then it is determined in step 946 whether a participant was specified by a group name. If the participants are specified by a group identification, then in step 948, the system runs a search of the database for all members of the group and then sends a notification to all of the group members in step 950. If the participants are not specified by a group name, then in step 960 it is determined whether a filter was used to specify the participants. If so, the filter is used to perform a query in step 962. All users who meet the query are sent a notification in step 964. If the participants are specified by a rule (step 970), then the Identity Server will access the attributes of the identity profile associated with the workflow currently being performed. The rule will include one or more dynamic variables. Each dynamic variable will specify an attribute of the identity profile. The Identity Server will access the data stored by those attributes. The data for those attributes are populated into the rule in step 974 to create the filter. That filter is then used to perform a query of the directory. In step 978, a notification is sent to each user identified by the query.

Figure 17:
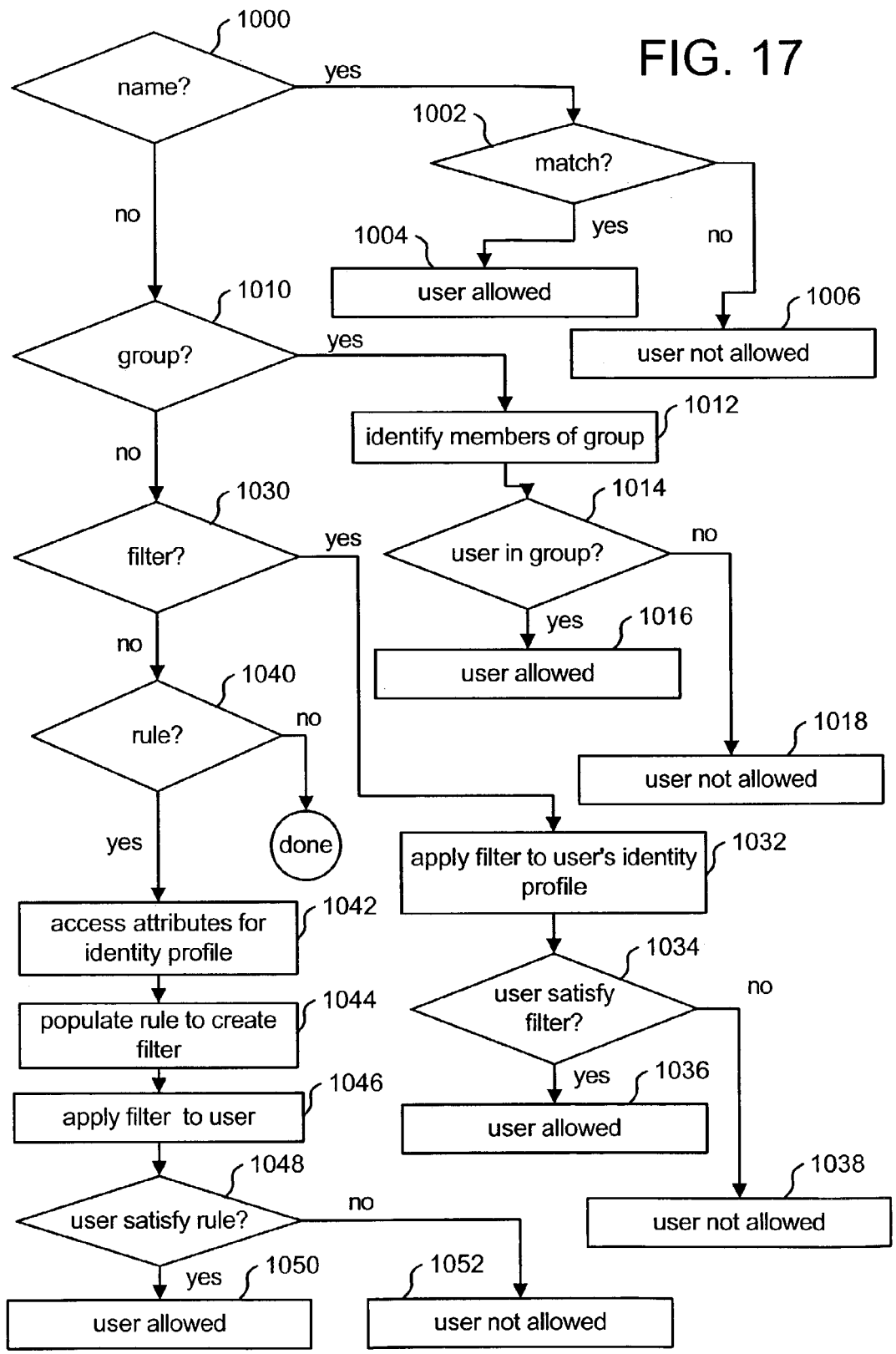
FIG. 17 is a flow chart describing one embodiment of a process for determining whether a user is allowed to perform an action of a workflow.

FIG. 17 is a flowchart describing one embodiment of a process for determining whether a user is allowed to perform an action of the workflow. That is, FIG. 17 provides more details of step 850 and 874 of FIG. 15. Remember, as discussed above, a participant in a step can be identified by name, group identification, filter, or rule. If the participant is identified by a name (step 1000), then in step 1002 it is determined whether the name of the person attempting to perform the step is the same as the name specified in the workflow. If so, the user is allowed to perform the step of the workflow (step 1004). If not, the user is not allowed to perform the step of the workflow (step 1006).

If the participant is not specified by a name (step 1000), then it is determined whether the participant is specified by an identification of a group (step 1010). If the participant is specified by identification of a group, then in step 1012, the members of the group are identified. In step 1014, it is determined whether the particular entity attempting to perform the step of the workflow is a member of that group. If so, that entity is allowed (step 1016) to perform the step. If not, the entity is not allowed to perform the step of the workflow (step 1018).

If the participant is specified by a filter (step 1030), then that filter is applied to the identity profile of the entity attempting to perform the step of the workflow (step 1032). If that entity's identity profile satisfies the filter, then that user is allowed to perform the workflow in step 1036. Otherwise, the user is not allowed to perform the step of the workflow (step 1038).

If the participants are specified by a rule (step 1040), then the rule is evaluated to identify the dynamic variables and access the attributes, corresponding to the dynamic variables, of the identity profile that is the subject of the workflow. Those accessed attributes are used to populate the rule in step 1044 in order to create a filter. The filter is applied to the identity profile of the user attempting to perform the step of the workflow. If the identity profile of the user attempting to perform the workflow satisfies the filter, then that user is allowed to perform the step of the workflow (step 1050). Otherwise, the user is not allowed to perform the workflow (step 1052).

One popular application for using workflows is to create a new user. FIG. 18 is a high level flowchart describing one embodiment of a process of creating a new user. In step 1100, an entity requests to create a new user. In step 1102, the requestor provides the name (John Smith), address (1312 Elm Street), title (Clerk) and organization (Sales) for the new user. Step 1102 is part of a workflow. As part of that workflow, in step 1104, a pre-notification is sent to a Human Resources Manager. The Human Resources Manager adds the region (West) to the region attribute for the new user being created in step 1106. The Human Resources Manager also overrides the data added for organization attribute to a new value (Marketing). In step 1108, as part of the workflow, a pre-notification is sent to the user's manager. The pre-notification is sent using a rule. That is, the workflow is configured such that the pre-notification is sent according to the following rule:

(&(objectClass=users)(title=admin)(OU=$OU$)
(region=$region$))

The above rule indicates that a pre-notification will be sent to all users who have a title of "admin" and are in the same organization as the newly created user and have the same region as the newly created user. Thus, the pre-notification may be sent to more than one manager or only one manager, depending on how many users satisfy the rule. The Identify Server will access the rule, identify the two dynamic variables ($OU$ and $region$), and replace those two dynamic variables with data from the identity profile being created. Once the dynamic variables are replaced, the rule has become the following filter:

(&(objectClass=users)(title=Admin)(OU=Marketing)
(region=West)).

The above filter is used to perform a query which identifies a set one or more managers, which are then sent a pre-notification. In step 110, the manager (or managers) who is pre-notified approves the new user. In step 112, the new user is completely created and stored in the directory.

More information about workflows can be found in U.S. patent application Ser. No. 09/998,910, "Template Based Workflow Definition," filed on Nov. 30, 2001, incorporated herein by reference in its entirety.

Entities managed by the Identity System may require access to a variety of resources that are external to the Identity System. For example, a user may need a telephone connection and/or accounts on various computer systems. A person working as an Identity System administrator can manually submit a request for the necessary external resources to one or more external provisioning systems. Alternatively, that request can be submitted automatically or semi-automatically.

A provisioning system services resource requests by establishing external resource access for an entity, such as an Identity System user. Most provisioning systems include one or more agents with each agent corresponding to an external resource. For each requested resource, the provisioning system assigns an agent to make the resource available to a specified entity. In one example, the provisioning system receives a request to establish a computer system account and telephone connection for a user. The provisioning system assigns one agent to create the computer account and another agent to create the telephone connection. Provisioning systems are also capable of terminating an entity's resource access. One implementation of an Identity System includes a Provisioning Bridge Server to manage communications with the provisioning systems—enabling the Identity System to automate the use of multiple provisioning systems.

Figure 19:
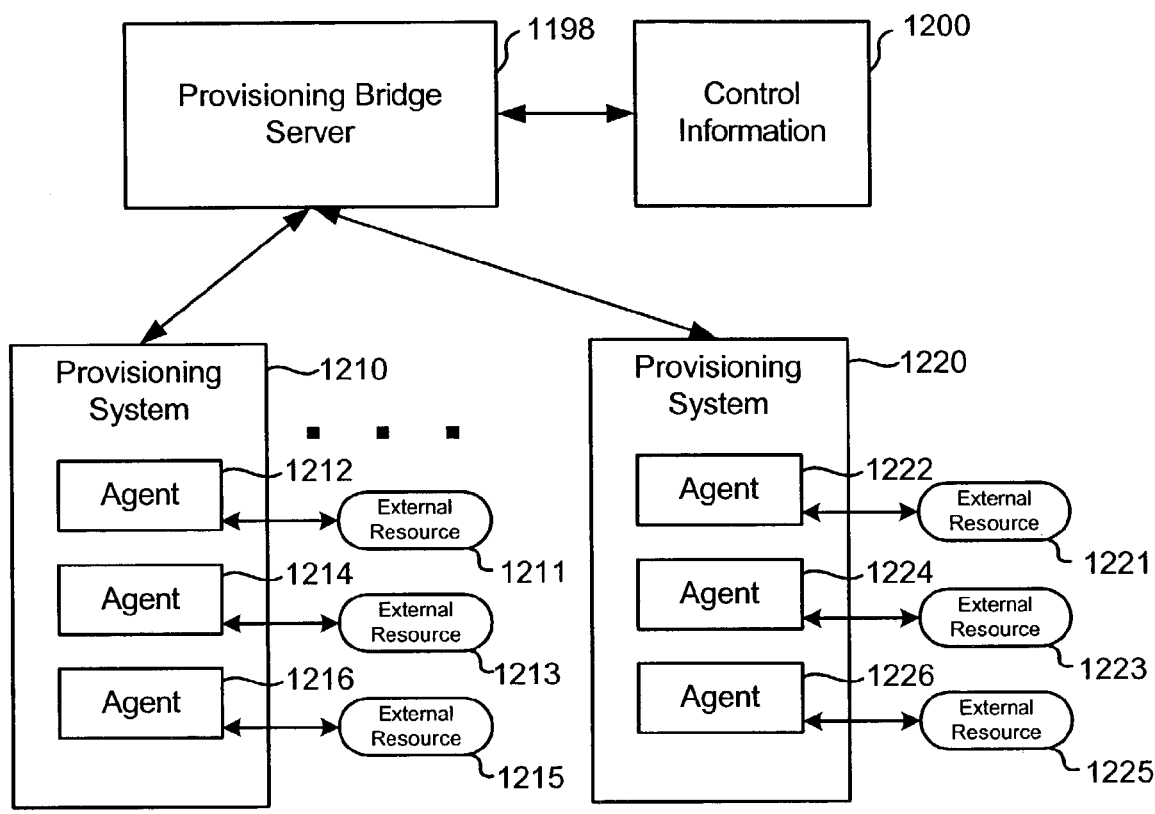
FIG. 19 is a block diagram depicting a Provisioning Bridge Server in operation with control information and provisioning systems.

FIG. 19 depicts a block diagram of Provisioning Bridge Server 49 in operation. Provisioning Bridge Server 1198 is in communication with control information 1200 and a set of provisioning systems, including provisioning systems 1210 and 1220. In one embodiment, control information 1200 is maintained in Directory Server 36. In another embodiment, control information 1200 is maintained in a storage device separate from Directory Server 36. In one implementation, Provisioning systems 1210 and 1220 are external to the Identity System. Provisioning systems 1210 and 1220 communicate with Provisioning Bridge Server 1198 through a communications link, such as a local area network, wide area network, or other known means. Those skilled in the art recognize that many different types of communication mediums are suitable for facilitating communication between Provisioning Bridge Server 1198 and provisioning systems 510 and 520. In another implementation, functionality may be included within the Identity System to perform the operation of a provisioning system.

Provisioning system 1210 includes agents 1212, 1214, and 1216. Provisioning system 1220 includes agents 1222, 1224, and 1226. Provisioning systems 1210 and 1220 receive requests from Provisioning Bridge Server 1198 to allocate or eliminate access to external resources for entities managed by the Identity System, such as users. Examples of external resources include applications and operating systems on computer systems and telephone connections. Provisioning systems 1210 and 1220 delegate each request they receive to an agent that is adapted to interface with the requested resource. Provisioning system 1210 may allocate a task to agent 1212, 1214, or 1216. Provisioning system 1220 may allocate a task to agent 1222, 1224, or 1226. As shown in FIG. 19, agents 1212, 1214, and 1216 support external resources 1211, 1213, and 1215, respectively. Agents 1222, 1224, and 1226 support external resources 1221, 1223, and 1225, respectively.

Multiple provisioning systems may be required to support all of the resources employed by the Identity System's entities. For example, provisioning system 1210 may only have agents that interface with engineering related external resources, and provisioning system 1220 may only have agents that interface with marketing related external resources. In one example, provisioning system 1210 employs agents 1212, 1214, and 1216 to provide and remove access to engineering related resources 1211, 1213, and 1215. Provisioning system 1220 employs agents 1222, 1224, and 1226 to provide and remove access to marketing related external resources 1221, 1223, and 1225.

Provisioning Bridge Server 1198 facilitates the Identity System's automated use of multiple provisioning systems 1210 and 1220. Provisioning Bridge Server 1198 maintains control information 1200, which correlates the external resources used by Identity System entities with the various provisioning systems. During operation, the Identity System may need to have a resource related task performed, such as providing an entity with access to a resource or eliminating an entity's access to a resource. Provisioning Bridge Server 1198 identifies the proper provisioning system for performing the resource related task and submits a request to the proper provisioning system to perform the task. Provisioning Bridge Server 1198 employs control information 500 to identify the proper provisioning system for performing the desired task.

In one implementation, control information 1200 includes entries with the following fields: 1) Job Code—identifying a classification assigned to an entity in the Identity System based on the entity's role in one or more organizations; 2) Viewable Domain—identifying the domain which can potentially have access to an IT Resource and; 3) IT Resource—an IT resource, including peripherals, computing devices, applications, data stores and other resources. This only provides one example of fields for control information 1200. Alternate embodiments of control information 500 may include numerous other configurations that correlate job codes, external resources, and provisioning systems.

Table 6 below shows one example of content stored in control information 500:

TABLE 6

| Job Code | Viewable Domain | IT Resource |
|---|---|---|
| A | corporate | NT1 |
| A | corporate | Unix22 |
| B | sales | WINXP34 |
| A | support | SAP |

Table 6 shows that provisioning bridge server 1198 needs to arrange for entities with job code A to receive access to IT resources NT1, Unix 22, and SAP. For example, NT1 can be a server running Windows NT, Unix 22 can be a server running the Unix operating system, and SAP can be an application. Entities with job code B are to be provided access to IT resource WINXP34 (e.g., computer running Windows XP). In one embodiment, providing access includes setting up an account for the appropriate user. The accounts can be set up by accessing the user identity profile in order to determine or read a username and/or password. In other embodiments, a random username and password/or can be created.

By employing job codes, the Identity System can provide entities, such as users, with a label that corresponds to the external resources the entity needs. The Identity System can assign job codes to an entity based on the role the entity plays in the organization managed by the Identity System. In one implementation the Identity System sets job codes for an entity based on the groups to which the entity belongs. The Identity System associates a job code attribute with an entity to identify all of the entity's job codes.

Figure 20:
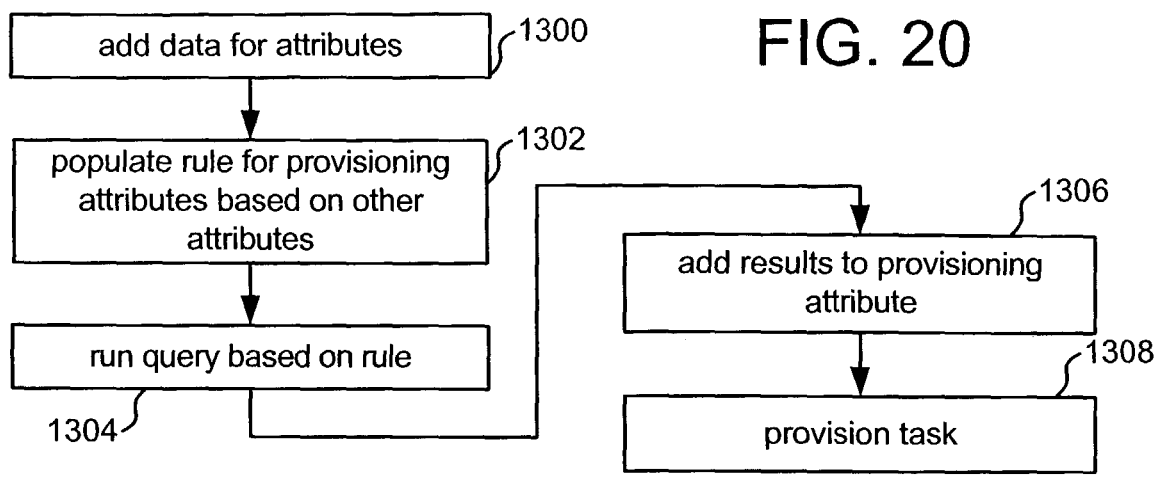
FIG. 20 is a flow chart describing a process for using the present invention with provisioning.

FIG. 20 is a flowchart describing one embodiment of a process for using provisioning with an identity profile. In step 1300, data is added for a set of attributes for an identity profile. That is, data is used to populate the values for one or more attributes. As described above, some attributes can be based on rules. These rules will have dynamic variables that use data from other attributes. These other attributes need to be populated before the rule can be applied. In step 1300, data for these other attributes is provided. As an example, assume that there is a rule specifying the data to be inserted into the IT Resources attribute. In step 1302, the Identity Server reads the rule, identifies the dynamic variables in the rule and replaces the dynamic variables with data from the attributes that were added in step 1300. In step 1304, the filter (the rule with the data populated in place of the dynamic variables) is used to perform a query of the data store. In step 1306, the results from the query are accessed to identify the specified attribute (e.g., job code or IT Resource Name) for each object of the result set. The returned job codes or IT Resource Names are then added into the IT Resources attribute for the identity profile under consideration. After updating the IT Resources attribute, one or more provisioning tasks are performed in step 1308. For example, the user is then set up with accounts on the specified IT Resources. In one embodiment, whenever an attribute field that is associated with provisioning is updated, an associated provisioning task is started. In other embodiments, a thread is started or queued. In other embodiments, a provisioning request is queued and a provisioning engine will periodically perform all queued provisioning tasks.

In one embodiment, an attribute can only be changed using a workflow. In other embodiments, an attribute can be changed using a user interface, without a workflow. In some embodiments, only users with appropriate access privileges can change an attribute. In some embodiments, attributes can only be changed with approval from a list of users (e.g. managers, administrators, etc.). The control information (discussed herein) is updated periodically. In some embodiments, the control information is updated automatically. In other embodiments, an administrator must manually update the control information.

Figure 21:
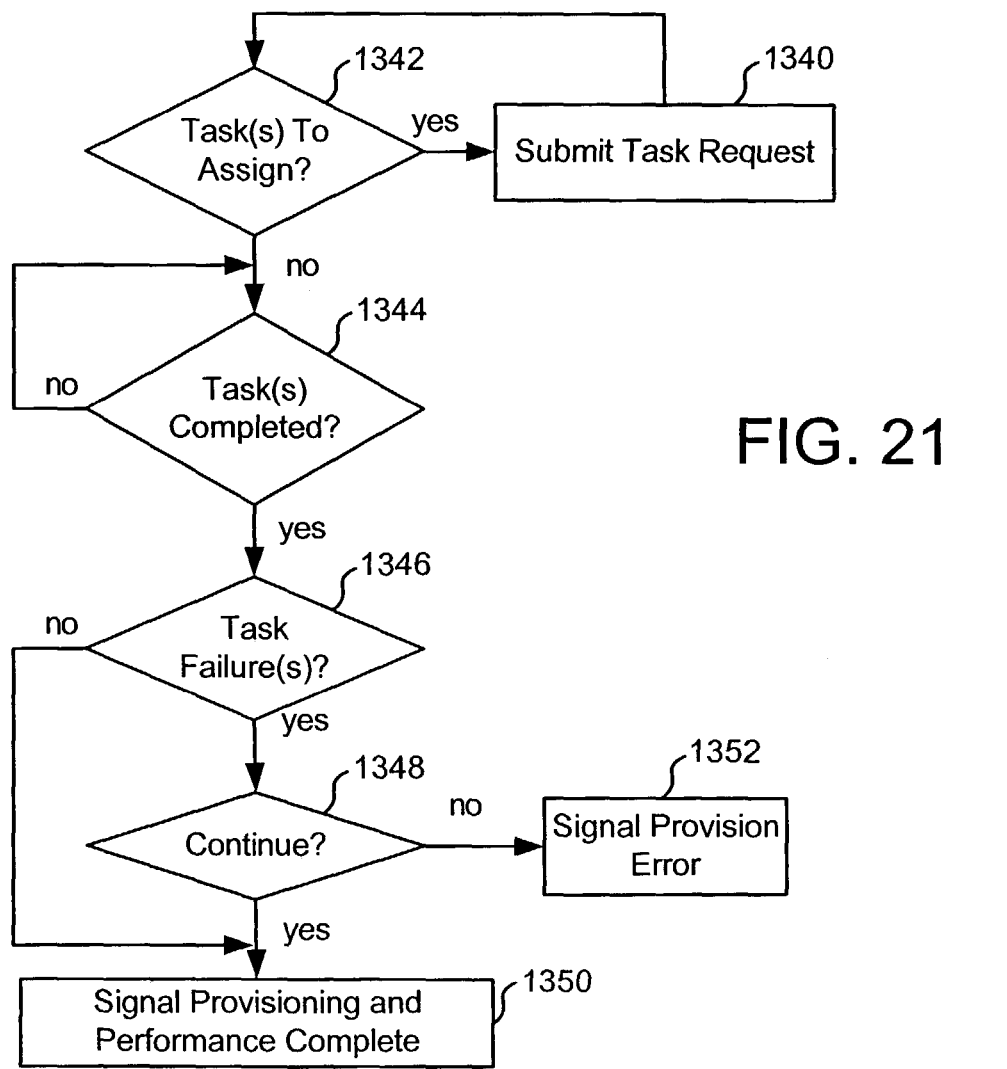
FIG. 21 is a flow chart describing a process for provisioning job code tasks.

FIG. 21 is a flow chart describing a process for performing provisioning tasks. FIG. 21 provides one example of the performance of step 1308 of FIG. 20. Provisioning Bridge Server 1198 determines whether any provisioning tasks need to be assigned to a provisioning system (step 1342). Provisioning Bridge Server 1198 accesses control information 500 when determining the required tasks and the provisioning systems that perform those tasks. Control information 1200 identifies the external resources, that need to be accessed for a job code and the provisioning system that supports each of the resources. If the job code is being added to the job code attribute, Provisioning Bridge Server 1198 recognizes that the required tasks will call for providing access to the external resources specified for the job code. If the job code is being deleted from a job code attribute, Provisioning Bridge Server 1198 recognizes that the required tasks will call for removing access to the external resources specified for the job code.

If there are tasks that have not yet been assigned to a provisioning system, Provisioning Bridge Server 1198 submits a request to one of the provisioning systems to perform a provisioning task (step 1340). Provisioning Bridge Server 1198 submits the request to the provisioning system that is identified in control information 1200. After the task request is submitted, Provisioning Bridge Server 1198 determines whether any other provisioning tasks still need to be assigned to a provisioning system (step 1342).

Once all of the job code related tasks have been assigned, Provisioning Bridge Server 1198 waits for the requested tasks to be completed (step 1344), regardless of whether they have failed or completed successfully. In one implementation, each provisioning system signals when a task has been completed—indicating whether it completed the task successfully or failed. Provisioning Bridge Server 1198 determines whether any of the tasks failed (step 1346). If none of the tasks failed, Provisioning Bridge Server 1198 signals that the provisioning tasks have all been successfully performed (step 1350). If any of the tasks failed (step 1346), Provisioning Bridge Server 1198 determines whether to continue with provisioning or cancel all provisioning (step 1348). If Provisioning Bridge Server 1198 is not to proceed with provisioning, a provisioning error is signaled (step 1352). In some embodiments, Provisioning Bridge Server 1198 may also undo tasks that have already been completed. In one implementation, Provisioning Bridge Server 1198 also provides a signal identifying the failed tasks (step 1352). The criteria for determining whether to continue in step 1348 can be set by a system administrator when the Identity System is initialized. Alternatively, Provisioning Bridge Server 1198 can send a message to a system administrator and wait for the reply to indicate whether to continue. Various other methods can be employed for making this determination.

In further embodiments, Provisioning Bridge Server 1198 does not submit all of the task requests and wait for their completion before proceeding. Instead, each task request is assigned to a separate thread of operation and proceeds individually. In one implementation this processing occurs in parallel. In yet another implementation, this processing occurs serially.

One example of provisioning is to automatically provide access to IT Resources for a particular user. For example, a new user can be created using a workflow. As part of the workflow, the user's name, title, address, and organization are entered into the identity profile. An attribute of the user's identity profile called IT Resources can be configured, as described above, to be populated based on a rule. One example of such a rule is the following:

(&(objectClass=OBESSJCMAPPING)
(obViewableDomain=$OU$)

This rule indicates that there will be a search through the directory for all objects of the objectClass OBESSJCMAPPING. Each object having a viewable domain equal to the organization name stored in the organization attribute of the newly created user will be returned. In one embodiment, the returned attribute will be one or more IT Resources. For example, Table 6 above provides a portion of a set of objects (OBESSJCMAPPING objects) that are stored in the directory. Those objects having the appropriate viewable domain will be returned. The identified attribute specified can be the IT Resource. In other embodiments, the identified attribute specified can be the job code. The returned IT Resources or job codes are then provided to an administrator, user, etc. This administrator, user, etc. can select the appropriate IT Resources or job codes. In other embodiments, all of the returned IT Resources or job codes will automatically be populated into the new user's IT Resource attribute, with no selection being made by the administrator, user, etc. Once the attribute is populated, a provisioning task can be started to provide the user with accounts on the IT Resources identified in the user's IT Resource attribute.

More information about provisioning tasks can be found in U.S. patent application Ser. No. 10/145,684, "Employing Job Code Attributes In Provisioning," filed on May 15, 2002, incorporated by reference herein in its entirety.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for performing rule-based identity management, comprising:

receiving, at an identity server, a request to add data to an identity profile for an entity, wherein the identity profile is stored as an object in a directory, wherein the directory comprises a database for storing one or more identity profiles, wherein the identity profile object is based on a class, wherein the class defines one or more attributes for the identity profile object such that the identity profile comprises one or more attributes, wherein the class defines a rule for a first attribute having one or more dynamic variables for a first attribute;

receiving an attribute value for a second attribute of the identity profile object;

accessing the class for the identity profile object;

reading the rule having one or more dynamic variables from the class;

automatically accessing the attribute value for the second attribute of the identity profile object based on the dynamic variable in the rule;

automatically applying the attribute value rule by replacing a dynamic variable in the rule with the attribute value of the second attribute to create a filter;

identifying additional data based on the filter, wherein identifying the additional data comprises:

using the filter to perform a query against the directory with the first-data to find a set of one or more objects in the directory matching the filter;

receiving an identification of a particular attribute in each of the one or more objects matching the filter;

accessing, for each of the one or more objects, the particular attribute to generate a list of one or more values, each value corresponding to the particular attribute in one of the one or more objects;

displaying, for a user, the list of one or more values; and
receiving a selection of one or more values from the list of values; and
adding the additional data to the identity profile, wherein the step of adding includes adding the selected one or more values to the first attribute in the identity profile.

2. A method according to claim 1, further comprising:
receiving the rule; and
receiving the attribute identification.

3. A method according to claim 1, wherein:
the additional data includes one or more job codes.

4. A method according to claim 1, wherein:
the additional data includes an identification of a resource external to a system that is performing the steps of accessing, applying, identifying and adding.

5. A method according to claim 1, wherein:
the additional data includes an identification of a first resource.

6. A method according to claim 1, wherein:
identifying additional data includes using the rule to search for control information about a set of resources.

7. A method according to claim 5, further comprising:
sending a request for the first resource in response to the step of adding.

8. A method according to claim 5, further comprising:
provisioning a task related to the first resource in response to the additional data.

9. A method for performing rule-based identity management, the method comprising:
receiving, at an identity server, a request to add data to an identity profile for an entity, wherein the identity profile is stored as an object in a directory, wherein the directory comprises a database for storing one or more identity profiles, wherein the identity profile object is based on a class, wherein the class defines one or more attributes for the identity profile object such that the identity profile comprises one or more attributes, wherein the class defines a rule having one or more dynamic variables;
accessing the class for the identity profile object;
reading the rule having one or more dynamic variables from the class, wherein the class defines one or more dynamic variables comprising a first dynamic variable that corresponds to a region attribute, a second dynamic variable that corresponds to an organization attribute, and a third dynamic variable that corresponds to a group attribute in the identity profile object for the entity;
receiving a first set of attribute values for the first dynamic variable, the second dynamic variable, and the third dynamic variable of the identity profile object;
storing the first set of attribute values;
automatically accessing the attribute values for the first group of dynamic variables of the identity profile object based on the dynamic variable in the rule
automatically applying the first set of attribute values to the rule by replacing the first dynamic variable with a value stored for the region attribute, replacing the second dynamic variable with a value stored for the organization attribute and replacing the third dynamic variable with a value stored for the group attribute in the identity profile object to create a filter;
identifying additional data based on the filter, wherein identifying the additional data comprises:
using the filter to perform a query against the directory with the first set of attribute values to find a set of one or more objects in the directory matching filter;
receiving an identification of a particular attribute in each of the one or more objects matching the filter, wherein the particular attribute refers to manager name;
accessing, for each of the one or more objects, the particular attribute to generate a list of one or more values, each value corresponding to the particular attribute in one of the one or more objects;
displaying, for a user, the list of one or more values; and
receiving a selection of one or more manager names; and
adding the additional data to the identity profile, wherein the step of adding includes adding at least one of the manager names to the identity profile.

10. A method according to claim 1, wherein:
the method is at least partially performed by an integrated Identity System and Access System.

11. A method for performing rule-based identity management, the method comprising:
receiving, at an identity server, a request to add data to an identity profile for an entity, wherein the identity profile is stored as an object in a directory, wherein the directory comprises a database for storing one or more identity profiles, wherein the identity profile object is based on a class, wherein the class defines one or more attributes for the identity profile object such that the identity profile comprises one or more attributes, wherein the class defines a rule having one or more dynamic variables for a first attribute;
receiving an attribute value for a second attribute of the identity profile object;
accessing the class for the identity profile object;
reading the rule having one or more dynamic variables from the class;
automatically accessing the attribute value for the second attribute of the identity profile object based on the dynamic variable in the rule and the identity profile object being accessed as part of a workflow;
automatically applying the attribute value to the rule by replacing a dynamic variable in the rule with the attribute value of the second attribute to create a filter;
identifying additional data based on the filter, wherein identifying the additional data comprises:
using the filter to perform a query against the directory with the first data to find a set of one or more objects in the directory matching the filter;
receiving an identification of a particular attribute in each of the one or more objects matching the filter;
accessing, for each of the one or more objects, the particular attribute to generate a list of one or more values, each value corresponding to the particular attribute in one of the one or more objects;
displaying, for a user, the list of one or more values; and
receiving a selection of one or more values from the list of one or more values; and
using the additional data to perform the work flow, wherein the additional data comprises the selected one or more values.

12. A method according to claim 11, wherein:
using the additional data includes contracting entities identified with the additional data.

13. A method according to claim 11, wherein:
identifying additional data comprises evaluating whether a second identity profile satisfies the rule with the first data.

14. A method according to claim 13, further comprising:
starting the workflow; and
adding attribute data to the first identity profile, the attribute data includes the first data, the step of using includes providing for a first entity to perform a step of the workflow.

15. A method according to claim 11, wherein:
the method is at least partially performed by an integrated Identity System and Access System.

16. One or more processor readable storage devices having processor readable code embodied on the processor readable storage devices, the processor readable code for programming one or more: processors, the processor readable code comprising:
code for receiving, at an identity server, a request to add data to an identity profile for an entity, wherein the identity profile is stored as an object in a directory, wherein the directory comprises a database for storing one or more identity profiles, wherein the identity profile object is based on a class, wherein the class defines one or more attributes for the identity profile object such that the identity profile comprises one or more attributes, wherein the class defines a rule having one or more dynamic variables for a first attribute;
code for receiving an attribute value for a second attribute of the identity profile object;
code for accessing the class for the identity profile object;
code for reading the rule having one or more dynamic variables from the class;
code for automatically accessing the attribute value for the second attribute of the identity profile object based on the dynamic variable in the rule;
code for automatically applying the attribute value to the rule by replacing a dynamic variable in the rule with the attribute value of the second attribute to create a filter;
code for identifying additional data based on the filter, wherein the code for identifying the additional data comprises:
code for using the filter to perform a query against the directory with the first data to find a set of one or more objects in the directory matching the filter;
code for receiving an identification of a particular attribute in each of the one or more objects matching the filter;
code for accessing, for each of the one or more objects, the particular attribute to generate a list of one or more values, each value corresponding to the particular attribute in one of the one or more objects;
code for displaying, for a user, the list of one or more values; and
code for receiving a selection of one or more values from the list of values; and
code for adding the additional data to the identity profile, wherein the code for adding includes adding s the elected one or more values to the first attribute in the identity profile.

17. One or more processor readable storage devices according to claim 16, wherein:
the additional data includes an identification of a first resource; and
the processor readable code further includes code for provisioning a task related to the first resource in response to the additional data.

18. One ore more processor readable storage devices according to claim 16, wherein:
the processor readable code at least partially implements an integrated Identity System and Access System.

19. One or more processor readable storage devices having processor readable code embodied on the processor readable storage devices, the processor readable code for programming one or more: processors, the processor readable code comprising:
code for receiving, at an identity server, a request to add data to an identity profile for an entity, wherein the identity profile is stored as an object in a directory, wherein the directory comprises a database for storing one or more identity profiles, wherein the identity profile object is based on a class, wherein the class defines one or more attributes for the identity profile object such that the identity profile comprises one or more attributes, wherein the class defines a rule having one or more dynamic variables for a first attribute;
code for receiving an attribute value for a second attribute of the identity profile object;
code for accessing the class for the identity profile object;
code for reading the rule having one or more dynamic variables from the class;
code for automatically accessing the attribute value for the second attribute of the identity profile object based on the dynamic variable in the rule and the identity profile object being accessed as part of a workflow;
code for automatically applying the attribute value to the rule by replacing a dynamic variable in the rule with the attribute value of the second attribute to create a filter;
code for identifying additional data based on the filter, wherein the code for identifying the additional data comprises:
code for using the filter to perform a query against the directory with the first data to find a set one or more objects in the directory matching filter;
code for receiving an identification of a particular attribute in each of the one or more objects matching the filter;
code for accessing, for each of the one or more objects, the particular attribute to generate a list of one or more values, each value corresponding to the particular attribute in one of the one or more objects;
code for displaying, for a user, the list of one or more values; and
code for receiving a selection of one or more values from the list of values; and
code for using the additional data to perform the work flow, wherein the additional data comprises the selected one or more values.

20. One or more processor readable storage devices according to claim 19, wherein the processor readable code further comprises:
code for starting the workflow; and
code for adding attribute data to the first identity profile, the attribute data includes the first data, the code for using includes code for providing for a first entity to perform a step of the workflow, the code for identifying additional data comprises code for evaluating whether a second identity profile satisfies the rule with the first data.

21. One or more processor readable storage devices according to claim 19, wherein:
the processor readable code at least partially implements an integrated Identity System and Access System.

22. An Identity System, comprising:
one or more storage devices; and
one or more processor wherein the storage devices comprise processor readable code executable by the processor(s), the processor readable code comprising:

code for receiving, at an identity server, a request to add data to an identity profile for an entity, wherein the identity profile is stored as an object in a directory, wherein the directory comprises a database for storing one or more identity profiles, wherein the identity profile object is based on a class, wherein the class defines one or more attributes for the identity profile object such that the identity profile comprises one or more attributes, wherein the class defines a rule having one or more dynamic variables for a first attribute;

code for receiving an attribute value for a second attribute of the identity profile object;

code for accessing the class for the identity profile object;

code for reading the rule having one or more dynamic variables from the class;

code for automatically accessing the attribute value for the second attribute of the identity profile object based on the dynamic variable in the rule;

code for automatically applying the attribute value to the rule by replacing a dynamic variable in the rule with the attribute value of the second attribute to create a filter;

code for identifying additional data based on the filter, wherein the code for identifying the additional data comprises:

code for using the filter to perform a query against the directory with first data to find a set of one or more objects in the directory matching the filter;

code for receiving an identification of a particular attribute in each of the one or more objects matching the filter;

code for accessing, for each of the one or more objects, the particular attribute to generate a list of one or more values, each value corresponding to the particular attribute in one of the one or more objects;

code for displaying, for a user, the list of one or more values; and code for receiving a selection of one or more values from the list of values; and code for adding the additional data to the identity profile, wherein the code for adding includes code for adding the selected one or more values to the first attribute in the identity profile.

23. An Identity System according to claim 22, wherein:

the additional data includes an identification of a first resource; and the processor readable code further includes code for provisioning a task related to the first resource in response to the additional data.

24. An Identity System according to claim 23, further comprising:

a provisioning bridge, the provisioning bridge includes the code for provisioning a task.

25. An Identity System, comprising:

one or more storage devices; and one or more processor wherein the storage devices comprise processor readable code executable by the processor(s), the processor readable code comprising:

code for receiving, at an identity server, a request to add data to an identity profile for an entity, wherein the identity profile is stored as an object in a directory, wherein the directory comprises a database for storing one or more identity profiles, wherein the identity profile object is based on a class, wherein the class defines one or more attributes for the identity profile object such that the identity profile comprises one or more attributes, wherein the class defines a rule having one or more dynamic variables for a first attribute;

code for receiving an attribute value for a second attribute of the identity profile object;

code for accessing the class for the identity profile object;

code for reading the rule having one or more dynamic variables from the class;

code for automatically accessing the attribute value for the second attribute of the identity profile object based on the dynamic variable in the rule and the identity profile object being accessed as part of a workflow;

code for automatically applying the attribute value to the rule by replacing a dynamic variable in the rule with the attribute value of the second attribute to create a filter;

code for identifying additional data based on the filter, wherein the code for identifying the additional data comprises:

code for using the filter to perform a query against the directory with the first data to find a set of one or more objects in the directory matching the filter;

code for receiving an identification of a particular attribute in each of the one or more objects matching the filter;

code for accessing, for each of the one or more objects, the particular attribute to generate a list of one or more values, each value corresponding to the particular attribute in one of the one or more objects;

code for displaying, for a user, the list of one or more values; and code for receiving a selection of one or more values from the list of values; and code for using the additional data to perform the work flow, wherein the additional data comprises the selected one or more values.

26. An Identity System according to claim 25, wherein the processor readable code further comprises:

code for starting the workflow; and code for adding attribute data to the first identity profile, the attribute data includes the first data, the code for using includes code for providing for a first entity to perform a step of the workflow, the code for identifying additional data comprises code for evaluating whether a second identity profile satisfies the rule with the first data.

27. A method according to claim 25, wherein the directory resides on a directory server.

28. A method according to claim 25, wherein the directory supports lightweight directory access protocol ("LDAP").

29. A method for performing rule based identity management in an identity system, the identity system being configured to provide identity management services for a network, the method comprising:

receiving, at the identity system, a request to create an identity profile for a user, wherein the identity profile is stored as an object in a directory, wherein the identity profile object is based on a class, wherein the class defines one or more attributes for the identity profile object such that the identity profile comprises one or more attributes, wherein each attribute being configured to store information about the user, wherein the class defines the rule having one or more dynamic variables for a first attribute;

providing a template that comprises an indication of one or more attributes for which values are to be provided;

receiving an attribute value for a second attribute of the identity profile object;

accessing the class for the identity profile object;

reading the rule having one or more dynamic variables from the class automatically accessing the attribute value for the second attribute of the identity profile object based on the dynamic variable in the rule;

automatically applying the attribute value to the rule by replacing a dynamic variable in the rule with the attribute value of the second attribute to create a filter;

identifying additional data based on the filter, wherein identifying the additional data comprises:

using the filter to perform a query against the directory with the first data to find a set of one or more objects in a directory matching the filter, receiving an identification of a particular attribute in each of the one or more objects matching the filter;

accessing, for each of the one or more objects, the particular attribute to generate a list of one or more values, each value corresponding to the particular attribute in one of the one or more objects;

displaying, for a user, the list of one or more values; and receiving a selection of a first attribute value for the first attribute, from the list of values;

creating the identity profile comprising the first attribute having the first attribute value and the second attribute having the second attribute value; and saving the identity profile object in the directory.

30. A method as recited by claim 29, wherein selecting a second attribute value comprises:

displaying, for a user, attributes from the plurality of objects; and allowing a user to select an attribute from the one of the plurality of object.

31. A method as recited by claim 29, wherein selecting a second attribute value comprises selecting a second attribute value without user input.

32. A method as recited by claim 29, wherein the request to add data to the first attribute in the identity profile comprises a request to create a new identity profile.

33. A method as recited by claim 32, wherein creating a new identity profile comprises:

accessing an object class information;

providing a template of attributes to the requester, wherein the template provides an indication of the attribute that need to be filled in; and receiving an initial value for the attribute.

\* \* \* \* \*

UNITED STATES PATENT AND TRADEMARK OFFICE
CERTIFICATE OF CORRECTION

PATENT NO. : 7,467,142 B2
APPLICATION NO. : 10/327607
DATED : December 16, 2008
INVENTOR(S) : Sinn et al.

It is certified that error appears in the above-identified patent and that said Letters Patent is hereby corrected as shown below:

Title page
On page 2, in column 1, under "U.S. Patent Documents", line 65, delete "Wechler, Jr." and insert -- Weschler, Jr. --, therefor.

On page 2, in column 2, under "U.S. Patent Documents", line 12, delete "Loo et al." and insert -- Tung Loo et al. --, therefor.

On page 3, in column 1, under "Other Publications", line 3, delete "host" and insert -- host- --, therefor.

In column 7, line 1, delete "a:" and insert -- a --, therefor.

In column 10, line 53, delete "group," and insert -- group. --, therefor.

In column 11, line 26, delete "integrated." and insert -- integrated --, therefor.

In column 12, line 45, delete "west)" and insert -- west)) --, therefor.

In column 12, line 50, delete "$region$)" and insert -- $region$)) --, therefor.

In column 13, line 29, after "a" delete "to".

In column 18, line 12, delete "data}" and insert -- data] --, therefor.

In column 18, line 58, delete "line (b-u)" and insert -- lines (b-u) --, therefor.

In column 20, line 16, after "subflow" insert -- . --.

In column 20, line 47, before "all" delete "the" and insert -- they --, therefor.

In column 21, line 56, delete "In" and insert -- in --, therefor.

In column 22, line 8, delete "In" and insert -- in --, therefor.

Signed and Sealed this

Seventeenth Day of August, 2010

David J. Kappos
*Director of the United States Patent and Trademark Office*

In column 28, line 54, in claim 1, after "value" insert -- to the --.

In column 29, line 55, in claim 9, delete "rule" and insert -- rule; --, therefor.

In column 31, lines 54-55, in claim 16, delete "s the elected" and insert -- the selected --, therefor.

In column 32, line 32, in claim 19, after "set" insert -- of --.

In column 33, line 26, in claim 22, after "with" insert -- the --.

In column 34, line 43, in claim 27, delete "method" and insert -- Identity System --, therefor.

In column 34, line 45, in claim 28, delete "method" and insert -- Identity System --, therefor.

In column 34, line 67, in claim 29, delete "class" and insert -- class; --, therefor.